(12) United States Patent
Thangarasa et al.

(10) Patent No.: US 11,134,504 B2
(45) Date of Patent: Sep. 28, 2021

(54) METHOD FOR REDUCING SERVING CELL INTERRUPTION DUE TO PROSE OPERATION

(71) Applicant: Telefonaktiebolaget LM Ericsson (publ), Stockholm (SE)

(72) Inventors: Santhan Thangarasa, Vällingby (SE); Muhammad Kazmi, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 42 days.

(21) Appl. No.: 15/565,484

(22) PCT Filed: Apr. 13, 2016

(86) PCT No.: PCT/IB2016/052080
§ 371 (c)(1),
(2) Date: Oct. 10, 2017

(87) PCT Pub. No.: WO2016/166664
PCT Pub. Date: Oct. 20, 2016

(65) Prior Publication Data
US 2018/0206252 A1 Jul. 19, 2018

Related U.S. Application Data

(60) Provisional application No. 62/146,722, filed on Apr. 13, 2015.

(51) Int. Cl.
*H04W 72/12* (2009.01)
*H04W 76/28* (2018.01)
(Continued)

(52) U.S. Cl.
CPC ....... *H04W 72/1215* (2013.01); *H04W 72/08* (2013.01); *H04W 76/28* (2018.02); *H04W 76/14* (2018.02); *H04W 76/15* (2018.02)

(58) Field of Classification Search
CPC . H04W 72/08; H04W 72/1215; H04W 76/14; H04W 76/15; H04W 76/28
See application file for complete search history.

(56) References Cited

U.S. PATENT DOCUMENTS 6,788,253 B1 * 9/2004 Calin .................... G01S 5/0215
342/357.64
7,826,340 B2 * 11/2010 Kalhan ............... H04L 27/3488
370/204
(Continued)

OTHER PUBLICATIONS

3GPP TSG RAN WG1 Meeting #77; Seoul, Korea; Source: Intel Corporation; Title: eNB Controlled Resource Allocation for D2D Communication (R1-142017)—May 19-23, 2014.
(Continued)

*Primary Examiner* — Khaled M Kassim
(74) *Attorney, Agent, or Firm* — Baker Botts, LLP

(57) ABSTRACT

A method in a network node (115) is disclosed. The method comprises determining (504) whether a wireless device (110) is configured with discontinuous reception on a first communication link. The method comprises comparing (508) a target quality for a second communication link with an interruption probability or rate due to operation of the first communication link, and selecting (512) a scheduling scheme based at least in part on the comparison of the target quality for the second communication link with the interruption probability or rate due to operation of the first communication link. The method comprises scheduling (516) one or more resources for the wireless device (110) according to the selected scheduling scheme.

9 Claims, 11 Drawing Sheets

(51) Int. Cl.
*H04W 72/08* (2009.01)
*H04W 76/15* (2018.01)
*H04W 76/14* (2018.01)

(56) References Cited

U.S. PATENT DOCUMENTS

| | | | |
|---|---|---|---|
| 9,729,388 B2* | 8/2017 | Kim | H04L 41/0668 |
| 9,756,543 B2* | 9/2017 | Nagaraj | H04W 36/00837 |
| 2002/0080895 A1* | 6/2002 | Lindberg | H04H 20/22 |
| | | | 375/316 |
| 2005/0051728 A1* | 3/2005 | Miyauchi | H04N 1/00002 |
| | | | 250/339.06 |
| 2005/0281244 A1* | 12/2005 | Toskala | H04W 76/15 |
| | | | 370/349 |
| 2006/0010206 A1* | 1/2006 | Apacible | H04M 3/436 |
| | | | 709/205 |
| 2007/0127411 A1* | 6/2007 | Brenner | H04W 24/04 |
| | | | 370/328 |
| 2009/0283756 A1* | 11/2009 | Hellings | H01L 29/0843 |
| | | | 257/24 |
| 2011/0149759 A1* | 6/2011 | Jollota | A61B 5/0024 |
| | | | 370/252 |
| 2011/0237231 A1 | 9/2011 | Horneman et al. | |
| 2011/0269449 A1* | 11/2011 | Kazmi | H04B 7/024 |
| | | | 455/422.1 |
| 2012/0108285 A1* | 5/2012 | Yamazaki | H04B 7/022 |
| | | | 455/509 |
| 2012/0122511 A1* | 5/2012 | Antonio | H04W 52/0232 |
| | | | 455/522 |
| 2013/0322586 A1* | 12/2013 | Tabet | H04L 25/0206 |
| | | | 375/350 |
| 2013/0324145 A1* | 12/2013 | Tabet | H04W 72/085 |
| | | | 455/452.2 |
| 2013/0337848 A1* | 12/2013 | Huertgen | H04W 24/00 |
| | | | 455/456.6 |
| 2014/0003260 A1* | 1/2014 | Tabet | H04W 72/1231 |
| | | | 370/252 |
| 2014/0004849 A1* | 1/2014 | Su | H04W 24/08 |
| | | | 455/423 |
| 2014/0126392 A1* | 5/2014 | George | H04W 52/0203 |
| | | | 370/252 |
| 2014/0187284 A1* | 7/2014 | Sanchez | H04B 7/0814 |
| | | | 455/550.1 |
| 2014/0269373 A1* | 9/2014 | Nimmala | H04B 7/0822 |
| | | | 370/252 |
| 2014/0355505 A1* | 12/2014 | Su | H04W 74/02 |
| | | | 370/311 |
| 2014/0372459 A1* | 12/2014 | Lu | G06F 16/23 |
| | | | 707/754 |
| 2015/0173027 A1* | 6/2015 | Zhang | H04W 52/241 |
| | | | 455/501 |
| 2015/0223087 A1* | 8/2015 | Yu | H04W 76/36 |
| | | | 455/418 |
| 2015/0341148 A1* | 11/2015 | Kazmi | H04L 5/0098 |
| | | | 370/252 |
| 2016/0050534 A1* | 2/2016 | Lim | G01S 5/0236 |
| | | | 370/252 |
| 2016/0142957 A1* | 5/2016 | Hu | H04W 36/0094 |
| | | | 370/331 |
| 2016/0248623 A1* | 8/2016 | Matsuura | H04Q 11/0066 |
| 2016/0302228 A1* | 10/2016 | Kazmi | H04L 1/1887 |
| 2017/0013653 A1* | 1/2017 | Suzuki | H04W 24/04 |
| 2017/0048773 A1* | 2/2017 | Miao | H04W 8/183 |
| 2017/0127217 A1* | 5/2017 | Miao | H04W 76/10 |

OTHER PUBLICATIONS

3GPP TSG RAN WG1 Meeting #77; Seoul, Korea; Source: Intel Corporation; Title: eNB Controlled Resource Allocation for D2D Communication; server date May 18, 2014; downloaded by EPO on May 18, 2014 (R1_142017)—May 19-23, 2014.

3GPP TSG-RAN WG1 Meeting #77; Seoul, Korea; Source: Fujitsu; Title: Interference management between D2D and WAN (R1-142074)—May 19-23, 2014.

3GPP TSG-RAN WG1 Meeting #77; Seoul, Korea; Source: Fujitsu; Title: Interference management between D2D and WAN; server date May 18, 2014; downloaded by EPO on May 18, 2014; (R1-142074)—May 19-23, 2014.

3GPP TSG RAN WG4 Meeting #72bis; Singapore; Source: Ericsson; Title: Requirements for PCell interruption for D2D UE (R4-146427)—Oct. 6-10, 2014.

3GPP TSG RAN WG4 Meeting #72bis; Singapore; Source: Ericsson; Title: Requirements for PCell interruption for D2D UE; server date Sep. 29, 2014; downloaded by EPO on Sep. 29, 2014 (R4-146427)—Oct. 6-10, 2014.

3GPP TSG-RAN WG4 Meeting #73; San Francisco, US; Source: Intel Corporation; Title: Further discussion on interruption requirements for D2D (R4-147708)—Nov. 17-21, 2014.

3GPP TSG-RAN WG4 Meeting #73; San Francisco, US; Source: Intel Corporation; Title: Further discussion on interruption requirements for D2D; server date Nov. 17, 2014; downloaded by EPO on Nov. 17, 2014(R4-147708)—Nov. 17-21, 2014.

PCT International Search Report for International application No. PCT/IB2016/052080—dated Sep. 1, 2016.

* cited by examiner

METHOD FOR REDUCING SERVING CELL INTERRUPTION DUE TO PROSE OPERATION

PRIORITY

This nonprovisional application is a U.S. National Stage Filing under 35 U.S.C. § 371 of International Patent Application Serial No. PCT/IB2016/052080 filed Apr. 13, 2016, and entitled "Method For Reducing Serving Cell Interruption Due to Prose Operation" which claims priority to U.S. Provisional Patent Application No. 62/146,722 filed Apr. 13, 2015, both of which are hereby incorporated by reference in their entirety.

TECHNICAL FIELD

The present disclosure relates, in general, to wireless communications and, more particularly, to methods for reducing serving cell interruption due to ProSe operation.

BACKGROUND

Device-to-device (D2D) user equipment (UEs) transmit D2D signals or channels in the uplink (UL) part of the spectrum. D2D operation by a UE is in a half-duplex mode (i.e., the UE can either transmit D2D signals/channels or receive D2D signals/channels). There may also be D2D relay UEs that may relay some signals to other D2D UEs. There is also control information for D2D. Some of the control information is transmitted by D2D UEs, and other control information is transmitted by eNodeBs (e.g., D2D resource grants for D2D communication transmitted via cellular downlink (DL) control channels). D2D transmissions may occur on resources which are configured by the network or selected autonomously by the D2D UE.

D2D communication implies transmitting by a D2D transmitter D2D data and D2D communication control information with scheduling assignments to assist D2D receivers of the D2D data. The D2D data transmissions are according to configured patterns and, in principle, may be transmitted rather frequently. Scheduling assignments are transmitted periodically. D2D transmitters that are within the network coverage may request eNodeB resources for their D2D communication transmissions, and receive in response D2D resource grants for scheduling assignment and D2D data. Furthermore, an eNodeB may broadcast D2D resource pools for D2D communication.

D2D discovery messages are transmitted in infrequent periodic subframes. eNodeBs may broadcast D2D resource pools for D2D discovery, both for reception and transmission.

D2D communication supports two different modes of operation: mode 1 and mode 2. In mode 1, the location of the resources for transmission of the scheduling assignment by the broadcasting UE comes from the eNodeB. The location of the resource(s) for transmission of the D2D data by the broadcasting UE also comes from the eNodeB. In mode 2, a resource pool for scheduling assignment is pre-configured and/or semi-statically allocated. The UE (on its own) selects the resource for scheduling assignment from the resource pool for scheduling assignment to transmit its scheduling assignment.

PCell interruption of 1 subframe occurs when a UE switches its reception between D2D-to-Wide Area Network (WAN) or WAN-to-D2D. This is because the UE receiver chain needs to be retuned every time operation is switched from WAN to D2D reception and from D2D to WAN reception. This applies to both D2D discovery and D2D communication capable UEs. It is important to partition uplink resources between cellular uplink and D2D operation in such a way that avoids or minimizes the risk of switching taking place in certain subframes—subframe #0 and/or subframe #5—of PCell. These subframes contain essential information such as Primary Synchronization Sequence (PSS)/Secondary Synchronization Sequence (SSS) that are necessary for doing cell search and carrying out cell measurements. These subframes also contain MIB/SIB1 information that is necessary for system information (SI) reading procedures. In addition to the interruption that takes place due to switching, there may be an additional interruption of 1 subframe due to the Radio Resource Control (RRC) reconfiguration procedure. While the switching interruption takes place for single receive UE (e.g., D2D discovery capable UEs), the RRC reconfiguration interruption takes place for all types of D2D UEs (e.g., D2D discovery capable and D2D communication capable).

D2D operation is a generic term which may comprise transmission and/or reception of any type of D2D signals (e.g., physical signals, physical channel, etc.) by a D2D communication capable UE and/or by a D2D discovery capable UE. D2D operation may therefore also be referred to as D2D transmission, D2D reception, D2D communication, etc.

A D2D UE may be interchangeably referred to as a Proximity Services (ProSe) capable UE. A D2D discovery capable UE may be referred to as a UE capable of ProSe direct discovery, and a D2D direct communication UE may be referred to as a UE capable of ProSe direct communication. D2D operation may be interchangeably referred to as ProSe operation. The link and carrier that is used for ProSe direct communication and ProSe direct discovery between UEs is referred to as sidelink. The ProSe operation performed by a UE may broadly comprise of ProSe reception (i.e., receiving ProSe signals) and/or ProSe transmission (i.e., transmitting ProSe signals).

FIG. 1 illustrates an example of discontinuous reception (DRX) cycle operation in LTE. In LTE, DRX cycle is used to enable a UE to save its battery. FIG. 1 illustrates a number of ON periods 5A-D. As shown in FIG. 1, each ON period may be followed by a DRX OFF period, such as DRX OFF period 10A following DRX ON period 5A. The DRX cycle is configured by a network node and is characterized by the following parameters: on-duration; inactivity-timer; and active-time.

The on-duration parameter is the duration in DL subframes that the UE waits to receive Physical Downlink Control Channels (PDCCHs) after waking up from DRX. If the UE successfully decodes a PDCCH, the UE stays awake and starts the inactivity timer.

The inactivity-timer: duration in downlink subframes that the UE waits to successfully decode a PDCCH, from the last successful decoding of a PDCCH, failing which it re-enters DRX. The UE shall restart the inactivity timer following a single successful decoding of a PDCCH for a first transmission only (i.e. not for retransmissions).

The active-time parameter is the total duration that the UE is awake. This includes the "on-duration" of the DRX cycle, the time the UE is performing continuous reception while the inactivity timer has not expired and the time the UE is performing continuous reception while waiting for a DL retransmission after one Hybrid Acknowledgement Repeat Request (HARQ) Round Trip Time (RTT). Based on the above, the minimum active time is of length equal to on-duration and the maximum is undefined (i.e., infinite).

In carrier aggregation (CA), a CA capable UE is configured with multiple serving cells (e.g., with a PCell and one or more SCells). Dual connectivity (DC) operation, which is a variant of CA, comprises of serving cells in a Master Cell Group (MCG) and a Secondary Cell Group (SCG). The MCG is a group of serving cells associated with the Master eNB (MeNB) comprising at least PCell and one or more SCells. The SCG is a group of serving cells associated with the Secondary eNB (SeNB) comprising at least Primary SCell (PSCell) and optionally one or more SCells.

In CA, the ProSe can be used on a sidelink on any of one or more of the serving cells (e.g., on PCell, on SCell, on PSCell, etc.). The ProSe related operations may cause interruption on WAN on the PCell or even on multiple serving cells in CA. Examples of ProSe related operations include turning the ProSe receiver chain on or off to retune the receiver, receiving ProSe in case UE reuses the WAN receiver in case it does not have a dedicated receiver for ProSe reception, and any other suitable ProSe related operations.

The interruption in DL and/or UL of the serving cell due to ProSe operations may cause serving cell performance degradation in WAN. If the UE has two more SCells, then the interruption may also occur on the activated SCell due to ProSe operations on cells of the SCC with deactivated SCell.

Typically, the interruption on WAN due to retuning of the ProSe receiver can be 1 ms. The metric to express such serving cell performance degradation can be expressed in terms of the serving cell (e.g., PCell) interruption probability of missed ACK/NACK in the uplink. For example, the maximum interruption probability or interruption rate (e.g., 0.5%) on WAN due to ProSe operations can be pre-defined, or the maximum rate can be configured by the network node. This metric is further elaborated below.

In LTE, the transmission opportunity or scheduling instance is 1 ms (i.e, 1 transmission time interval (TTI)). Therefore, for example, the number of packets lost in LTE Frequency Division Duplex (FDD) (or Time Division Duplex (TDD) with all DL subframes) is 10 if the UE is unable to transmit 10 ACK/NACK in UL in response to continuous DL transmission over a period of 100 ms. In this example, the corresponding interruption probability of missed ACK/NACK in UL is 10% or 0.1. This may also be stated as the probability with which the fraction of ACK/NACK transmitted in the uplink in response to continuous DL transmission over a period are missed or dropped or lost. It may also be expressed as a ratio of the number of missed ACK/NACK in response to continuous transmission of data to the UE from its serving cell over certain time period (TO) to the total number of ACK/NACK in response to continuous transmission of data to the UE from its serving cell if all data blocks are received.

The serving cell (e.g., PCell) interruption probability of missed ACK/NACK in the uplink may be interchangeably referred to as the 'serving cell interruption probability' for simplicity.

The network node is not aware when the interruption on WAN occurs due to ProSe operations. This may result in loss of data, as well as control channel including wastage of scheduling grant. For example, unpredictable loss of scheduling grants may require the network node to reschedule the UE with PDCCH using more resource elements (e.g., control channels resource elements) and/or using more transmit power. This may result in wasted resources. In Rel-12, ProSe requirements, some agreements have been reached regarding when a ProSe Direct Communication capable UE can cause interruption on cellular links (also known as WAN). One such event that causes interruption is turning ON/OFF a receiver chain (e.g., a dedicated ProSe receiver chain).

SUMMARY

To address the foregoing problems with existing approaches, disclosed is a method in a network node. The method comprises determining whether a wireless device is configured with discontinuous reception on a first communication link, and comparing a target quality for a second communication link with an interruption probability or rate due to operation of the first communication link. The method comprises selecting a scheduling scheme based at least in part on the comparison of the target quality for the second communication link with the interruption probability or rate due to operation of the first communication link, and scheduling one or more resources for the wireless device according to the selected scheduling scheme.

In certain embodiments, the first communication link may comprise sidelink communication and the second communication link may comprise wide area network communication. The target quality for the second communication link may comprise one of a target block error ratio and a target frame error rate. In certain embodiments, the method may comprise receiving, from the wireless device, information about at least one of an actual quality for the second communication link and an actual interruption rate for the first communication link. In certain embodiments, the method may comprise changing a discontinuous reception cycle configuration for the wireless device based on the received information.

In certain embodiments, selecting the scheduling scheme may comprise selecting a first scheduling scheme upon determining that the wireless device is not configured with discontinuous reception on the first communication link and that the target quality for the second communication link is less than the interruption probability or rate due to operation of the first communication link. Scheduling one or more resources for the wireless device according to the selected first scheduling scheme may comprise scheduling one or more resources for the second communication link that at least partly overlap in time with one or more resources configured for the first communication link.

In certain embodiments, selecting the scheduling scheme may comprise selecting a second scheduling scheme upon determining that the wireless device is not configured with discontinuous reception on the first communication link and that the target quality for the second communication link is not less than the interruption probability or rate due to operation of the first communication link. Scheduling one or more resources for the wireless device according to the selected second scheduling scheme may comprise scheduling one or more resources for the second communication link in any subframe or slot.

In certain embodiments, the method may comprise upon determining that the wireless device is configured with discontinuous reception on the first communication link, determining whether a discontinuous reception cycle for the first communication link is the same as a discontinuous reception cycle for the second communication link. Selecting the scheduling scheme may comprise selecting a third scheduling scheme upon determining that the discontinuous reception cycle for the first communication link is not the same as the discontinuous reception cycle for the second communication link and that the target quality for the second communication link is less than the interruption probability or rate due to operation of the first communication link. Scheduling one or more resources for the wireless device according to the selected third scheduling scheme may comprise scheduling one or more resources for the second communication link that at least partly overlap with an ON duration of the discontinuous reception cycle for the first communication link.

In certain embodiments, selecting the scheduling scheme may comprise selecting a fourth scheduling scheme upon determining that the discontinuous reception cycle of the first communication link is not the same as the discontinuous reception cycle for the second communication link and that the target quality for the second communication link is not less than the interruption probability or rate due to operation of the first communication link. Scheduling one or more resources for the wireless device according to the selected fourth scheduling scheme may comprise scheduling one or more resources for the second communication link regardless of whether the one or more resources overlap with an ON duration of the discontinuous reception cycle for the first communication link.

In certain embodiments, selecting the scheduling scheme may comprise selecting a fifth scheduling scheme upon determining that the discontinuous reception cycle for the first communication link is the same as the discontinuous reception cycle for the second communication link. Scheduling one or more resources for the wireless device according to the selected fifth scheduling scheme may comprise scheduling one or more resources for the second communication link that at least partly overlap with an ON duration of the discontinuous reception cycle for the second communication link.

Also disclosed is a network node. The network node comprises one or more processors. The one or more processors are configured to determine whether a wireless device is configured with discontinuous reception on a first communication link, and compare a target quality for a second communication link with an interruption probability or rate due to operation of the first communication link. The one or more processors are configured to select a scheduling scheme based at least in part on the comparison of the target quality for the second communication link with the interruption probability or rate due to operation of the first communication link, and schedule one or more resources for the wireless device according to the selected scheduling scheme.

Also disclosed is a method in a wireless device. The method comprises determining a maximum interruption rate due to operation of a first communication link, and determining a target quality for a second communication link. The method comprises comparing the target quality for the second communication link with the maximum interruption rate, and adapting one or more receiver behaviors of the wireless device based at least in part on the comparison of the target quality for the second communication link with the maximum interruption rate.

In certain embodiments, the first communication link may comprise sidelink communication and the second communication link may comprise wide area network communication. The target quality for the second communication link may comprise one of a target block error ratio and a target frame error rate.

In certain embodiments, adapting one or more receiver behaviors of the wireless device may comprise upon determining that the target quality for the second communication link is not lower than the maximum interruption rate, turning off a receiver chain for the first communication link. In certain embodiments, adapting one or more receiver behaviors of the wireless device may comprise upon determining that the target quality for the second communication link is lower than the maximum interruption rate, not turning off a receiver chain for the first communication link.

In certain embodiments, the method may comprise receiving, from a network node, information indicating whether the wireless device is allowed to turn off a receiver chain for the first communication link. The method may comprise sending, to a network node, information indicating a result of the comparison of the target quality for the second communication link with the maximum interruption rate. The method may comprise sending, to a network node, information about at least one of an actual quality for the second communication link and an actual interruption rate for the first communication link.

Also disclosed is a wireless device. The wireless device comprises one or more processors. The one or more processors are configured to determine a maximum interruption rate due to operation of a first communication link, and determine a target quality for a second communication link. The one or more processors are configured to compare the target quality for the second communication link with the maximum interruption rate, and adapt one or more receiver behaviors of the wireless device based at least in part on the comparison of the target quality for the second communication link with the maximum interruption rate.

Certain embodiments of the present disclosure may provide one or more technical advantages. For example, certain embodiments may advantageously adapt WAN scheduling such that WAN performance is not degraded due to interruption caused by ProSe operation. As another example, by taking into account the configured target BLER at the cell and pre-defined interruption rate due to ProSe operation when performing scheduling of WAN UEs, certain embodiments may advantageously avoid configurations that degrade WAN performance by avoiding scheduling of UEs that are subject to interruption. Instead, the various embodiments described herein may improve WAN performance for UEs that may require high quality of service by scheduling them in subframes that are not subject to interruption. This may advantageously ensure that the quality of service of such UEs is maintained. As another example, certain embodiments may improve the overall WAN performance and system capacity while not limiting the ProSe performance and capacity. From the perspective of a ProSe UE, the various embodiments described herein may advantageously allow the ProSe UE to use information on configured target BLER and maximum interruption rate to determine whether to turn its ProSe receiver chain ON/OFF. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
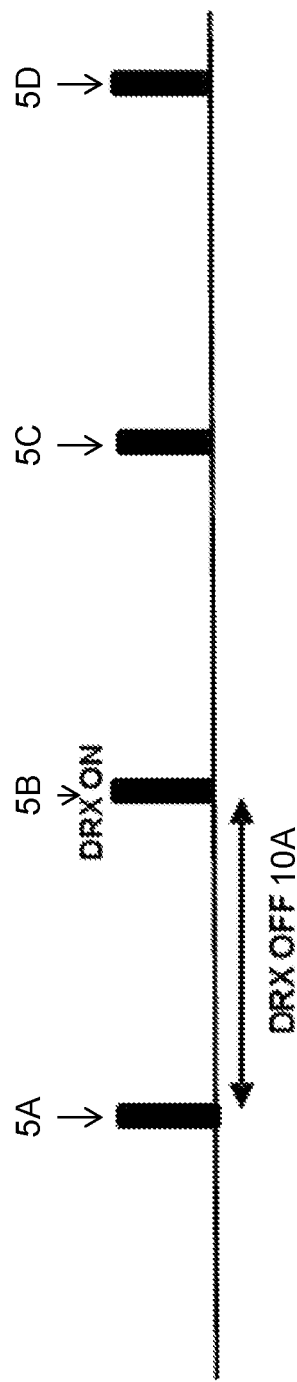
FIG. 1 illustrates an example of discontinuous reception cycle operation in LTE.

As described above, there are certain deficiencies associated with existing approaches in which ProSe operation may cause interruptions on the cellular link. One problematic scenario is when a UE is not configured with DRX on a receiver chain used for WAN, and it is configured with DRX on a ProSe receiver chain. The introduction of DRX to ProSe direct communication capable UE or ProSe direct discovery capable UE may advantageously allow the UE to reduce power consumption by enabling the ProSe capable UE to turn the ProSe receiver chain OFF when there is no ProSe operation for a period of time, and then turn the receiver chain ON when it is time to perform ProSe operation. Each event of turning the receiver chain ON/OFF, however, results in an interruption of 1 subframe on the PCell, and all other configured cells (e.g., SCells) if the UE is configured with CA and all configured carriers in case of multi-carrier operation.

A consequence of this is that the interruption may hit scheduling of WAN UEs, and especially UEs with high Quality of Service (QoS) may be impacted if the activation/de-activation of DRX and/or turning receiver chain ON/OFF is performed with no coordination with WAN. This may degrade WAN performance as data packets scheduled during the interruption subframes will be lost, high QoS UEs will experience significantly degraded quality if scheduling is not coordinated, and lost subframes will require retransmissions. These retransmissions result in waste of WAN resources and delayed and/or degraded WAN performance.

Another problematic scenario is when both WAN and ProSe are not configured with DRX or when they are configured with the same DRX. This scenario may cause problems for WAN UEs when they are scheduled in subframes that are subject to interruption due to activation/de-activation of the ProSe receiver chain. These interruptions may cause performance degradation in WAN, including loss of data as well as control channels. The present disclosure contemplates various embodiments that may address these and other deficiencies associated with existing approaches with respect to interruptions caused by ProSe operation.

For example, in certain embodiments, a method in a network node is disclosed. The network node determines whether a wireless device is configured with discontinuous reception on a first communication link. In certain embodiments, the first communication link may be a D2D communication link (i.e., sidelink). The network node compares a target quality for a second communication link with an interruption probability or rate due to operation of the first communication link. In certain embodiments, the second communication link may be a wide area network (e.g., cellular) communication link. The target quality for the second communication link may, for example, be one of a target block error ratio and a target frame error rate. The network node selects a scheduling scheme based at least in part on the comparison of the target quality for the second communication link with the interruption probability or rate due to operation of the first communication link, and schedules one or more resources for the wireless device according to the selected scheduling scheme.

By taking into account the target quality at the (serving) cell and interruption probability or rate due to ProSe operation when performing scheduling of WAN UEs, the various embodiments may advantageously avoid configurations that degrade WAN performance by avoiding scheduling of UEs that are subject to interruption. In certain embodiments, WAN performance for UEs that may require high QoS may be improved by scheduling them in subframes that are not subject to interruption. This may advantageously ensure that the QoS of such UEs is maintained. Furthermore, certain embodiments may improve the overall WAN performance and system capacity while not limiting the ProSe performance and capacity.

As another example, in certain embodiments a method in a wireless device is disclosed. The wireless device determines a maximum interruption rate due to operation of a first communication link. In certain embodiments, the first communication link may be a D2D communication link (i.e., sidelink). The wireless device determines a target quality for a second communication link. In certain embodiments, the second communication link may be a WAN (e.g., cellular) communication link. The target quality for the second communication link may be one of a target block error ratio and a target frame error rate. The wireless device compares the target quality for the second communication link with the maximum interruption rate, and adapts one or more receiver behaviors of the wireless device based at least in part on the comparison of the target quality for the second communication link with the maximum interruption rate.

From the perspective of a ProSe UE, the various embodiments described herein may advantageously allow the UE to use information on configured target BLER and maximum interruption rate to determine whether to turn its ProSe receiver chain ON/OFF. Furthermore, as described in more detail below, in certain embodiments the impact of interruptions may be further diminished by enabling the UE to receive an explicit command from the network node regarding whether the UE is allowed to turn its ProSe receiver chain ON/OFF, as well as receive an explicit command from the network node regarding what actions to take.

Figure 2:
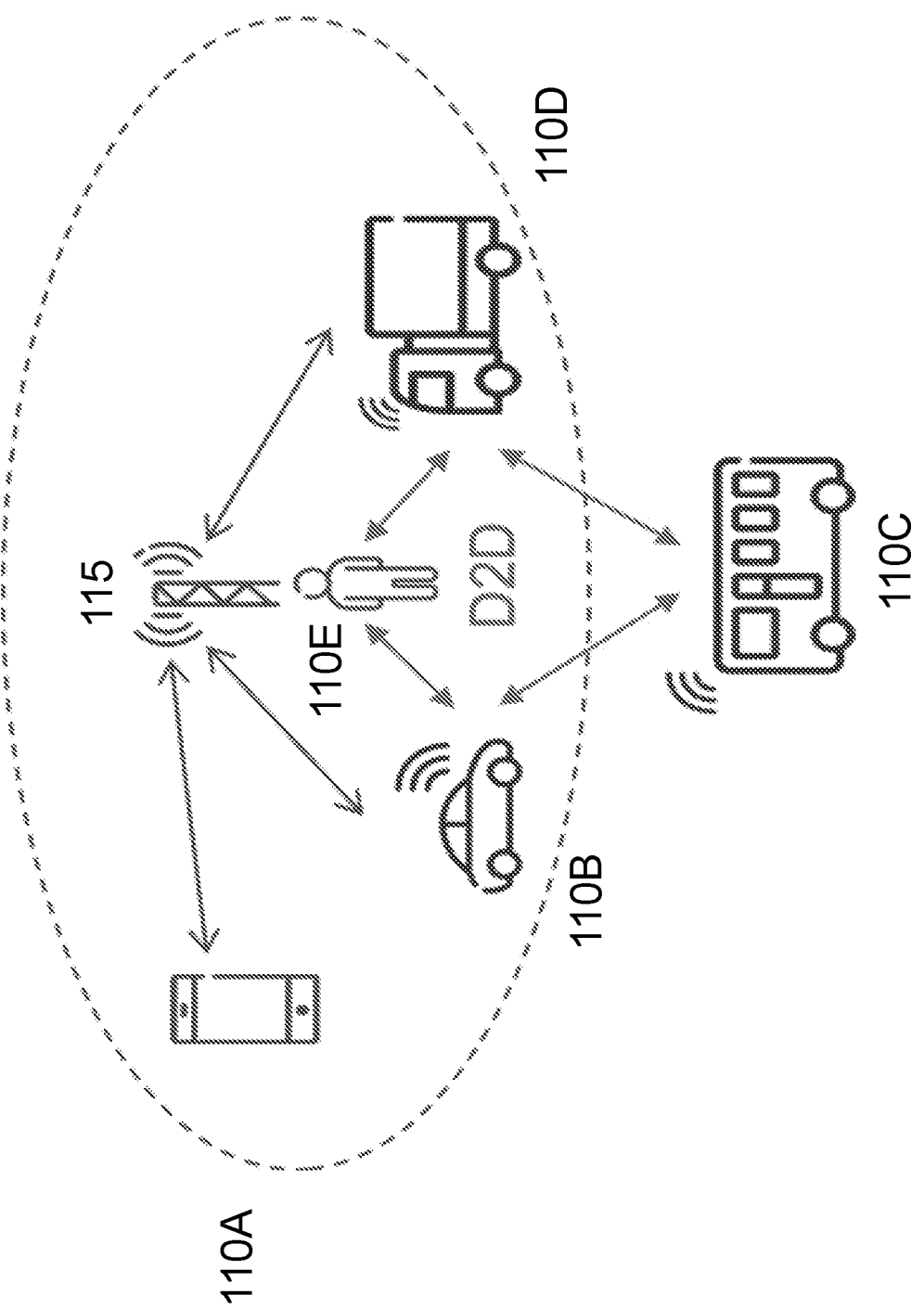
FIG. 2 illustrates an embodiment of a wireless communications network, in accordance with certain embodiments.

FIG. 2 illustrates an embodiment of a wireless communications network 100, in accordance with certain embodiments. More particularly, FIG. 2 is a block diagram illustrating an embodiment of a network 100 that includes one or more UEs 110 (which may be interchangeably referred to as wireless devices 110) and network node(s) 115 (which may be interchangeably referred to as eNBs 115). More particularly, UE 110A is a smart phone, UEs 110B-D are vehicles, and UE 110E is a pedestrian having a wireless device 110, such as, for example, a smart phone. UEs 110 may be ProSe capable UEs (and may be interchangeably referred to as ProSe UEs 110). UEs 110 may communicate with network node 115, or with one or more other UEs 110 over a wireless interface. For example, UEs 110A, 110B, and 110D may transmit wireless signals to network node 115 and/or receive wireless signals from network node 115. UEs 110 may also transmit wireless signals to other UEs 110 and/or receive wireless signals from other UEs 110. For example, UEs 110B, 110C, 110D, and 110E may communicate using D2D communication. The wireless signals may contain voice traffic, data traffic, control signals, and/or any other suitable information. In some embodiments, an area of wireless signal coverage associated with network node 115 may be referred to as a cell.

In certain embodiments, network node 115 may interface with a radio network controller. The radio network controller may control network node 115 and may provide certain radio resource management functions, mobility management functions, and/or other suitable functions. In certain embodiments, the functionality of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding.

In some embodiments, the core network node may manage the establishment of communication sessions and various other functionalities for UEs 110. UE 110 may exchange certain signals with the core network node using the non-access stratum layer. In non-access stratum signaling, signals between wireless device 110 and the core network node may be transparently passed through the radio access network. Example embodiments of UE 110, network node 115, and other network nodes (such as radio network controller or core network node) are described in more detail below with respect to FIGS. 7-11 below.

In some embodiments, the general term "network node" is used and it can correspond to any type of radio network node or any network node that communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. MSC, MME, etc.), O&M, OSS, SON, positioning node (e.g. E-SMLC), MDT or any other suitable network node.

In some embodiments, the non-limiting term UE is used and it refers to any type of wireless device communicating with a network node and/or with another UE in a cellular or mobile communication system. Examples of UE include target device, D2D UE, machine-type-communication (MTC) UE or UE capable of machine-to-machine communication (M2M), low-cost and/or low-complexity UE, a sensor equipped with UE, Tablet, mobile terminals, smart phone, laptop embedded equipment (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In certain embodiments, UE 110 may be capable of operating in out of network coverage (ONC) scenarios.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

Although FIG. 2 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which the UE receives and/or transmits signals (e.g., data). For example, the various embodiments described herein may be applicable to LTE, LTE-Advanced, UMTS, HSPA, GSM, cdma2000, WiMax, WiFi, another suitable radio access technology (including 5G standards), or any suitable combination of one or more radio access technologies. Moreover, although the principles are exemplified for ProSe Direct Communication type UEs in this embodiment, the same principle may hold for other types of ProSe UEs (such as, for example, ProSe Direct Discovery capable UEs) from onwards.

Although certain embodiments may be described in the context of wireless transmissions in the downlink, the present disclosure contemplates that the various embodiments are equally applicable in the uplink. Moreover, the various embodiments described herein are applicable for WAN and/or ProSe operations on single carrier or on multicarrier aka carrier aggregation (CA). The embodiments are also applicable for WAN and/or ProSe operations in dual connectivity (DC).

Furthermore, although certain example embodiments may be described in terms of sidelink and WAN communication link as the first communication link and the second communication link, respectively, the various embodiments are not limited to such an example. The present disclosure contemplates that the first communication link and second communication links may be any suitable communication links, and that the various embodiments may be applicable to any scenario in which one communication link is subject to interruption by operation of a second communication link.

As described above, one problematic scenario is when a UE 110 is not configured with DRX on a receiver chain used for WAN, and is configured with DRX on a ProSe receiver chain. It is believed that DRX or a similar type of functionality may be introduced to ProSe direct communication capable UE or ProSe direct discovery capable UE in order to reduce UE power consumption. A ProSe UE may choose to turn the ProSe receiver chain OFF during the time UE is inactive on ProSe. The UE may later turn the receiver chain ON when it is time to perform ProSe. These steps of turning receiver chain ON and OFF correspond to UE initiating and terminating ProSe (RRC configuration procedure), resulting in interruption on 1 subframe on WAN. During the interruption subframe, the UE may not be able to perform any WAN transmission or reception on any of the configured cells for the UE (such as, for example, PCell, PSCell, SCell, etc.).

This is similar to DRX functionality, in which a UE 110 sleeps most of the time (length depends on the DRX cycle length), and wakes up periodically to receive control messages. The main difference is that in this case each event of turning the receiver chain ON/OFF results in an interruption of 1 subframe on the PCell, and all other configured cells (e.g., SCells) if UE 110 is configured with CA and all configured carriers in case of multi-carrier operation. The ProSe UE 110 may perform the steps of turning the receiver chain ON/OFF during activation/de-activation of DRX and/ or at other time instances independently of WAN traffic.

A consequence of this is that WAN interruption may severely impact the WAN performance and system capacity. In addition, the interruption may hit scheduling of WAN, and especially UEs 110 with high Quality of Service (QoS). UEs with high QoS may be impacted if the activation/de-activation of DRX and/or turning receiver chain ON/OFF is performed with no coordination with WAN. This may degrade WAN performance as data packets scheduled during the interruption subframes will be lost, and high QoS UEs 110 will experience significantly degraded quality if scheduling is not coordinated and lost subframes will require retransmissions resulting in waste of WAN resources and delayed and/or degraded WAN performance.

Another problematic scenario is when both WAN and ProSe are not configured with DRX, or when they are configured with the same DRX. This scenario may cause problems for WAN UEs when they are scheduled in subframes that are subject to interruption due to activation/de-activation of ProSe receiver chain.

The present disclosure contemplates various embodiments that may address these and potentially other problems related to interruption of WAN due to ProSe operation. More specifically, the present disclosure contemplates methods in one or more network nodes 115 and methods in UEs 110 performing ProSe operation.

In certain embodiments, network node 115 may be serving a first cell, say PCell (also known as serving cell). A ProSe capable UE, such as UE 110B, can be pre-configured with resources on a first communication link. For example, UE 110B can be pre-configured with ProSe resources for ProSe operation on sidelink. The pre-configured ProSe resources may in particular be used by UE 110B when operating in Out-of-Network Coverage (ONC). The sidelink may operate on a carrier of the PCell (also known as serving carrier frequency or intra-frequency carrier). The sidelink may also be configured for ProSe operation on a non-serving carrier of UE 110B, for example an inter-frequency carrier frequency for WAN measurements or carrier frequency only configured for ProSe operation.

In some embodiments, UE 110B may also be configured with another cell that is configurable upon need basis, for example SCell1. In some embodiments, SCell1 may be served by a second network node. The various embodiments described herein apply regardless of whether PCell and one or more SCells are served by the same or different network nodes. In this case, UE 110B can be pre-configured with ProSe resources for ProSe operation on the first communication link (i.e., sidelink), which may operate on carrier of PCell or of SCell or of any non-serving carrier. In certain embodiments, UE 110B can be pre-configured with ProSe resources for ProSe operation on a plurality of sidelinks (e.g., carriers of PCell, SCell1 and non-serving carrier). In some cases, network node 115 may also configure UE 110B with a third cell, SCell2, on a different carrier on need basis. Network node 115 may also configure UE 110B with more than 3 serving cells based on data rate requirement of UE 110B.

UE 110B may also be configured with a target quality for operation on a second communication link (e.g., WAN communication link). For example, UE 110B may be configured with a target quality for WAN operation (also referred to as a WAN target quality (Q)). The target quality may be any suitable measure, including, for example, a target BLER, a target FER, or any other suitable measure. The WAN target quality (Q) can be the same or different on different serving cells in case of CA operation.

The WAN network may consist of several UEs 110 requiring varying QoS targets. For example, some of them may require high QoS for certain types of delay intolerant applications or any other suitable applications. Other types of UEs 110 may accept relatively longer delays, and thus may not require high QoS. Network node 115 can configure UEs 110 with different target qualities (e.g., FER, BLER, etc.). For example, network node 115 may configure a high QoS demanding UE 110 with a relatively low target BLER, while network node 115 may configure other UEs 110 with a relatively high target BLER. Examples of low target BLER and high target BLER target are 0.25% and 10%, respectively. Another set of examples of low target BLER and high target BLER are 0.1% and 1% respectively. The present disclosure contemplates that the target BLERs may be any suitable percentages. In certain embodiments, the low target BLER may avoid or minimize the need for retransmission of packets. As a result, the delay to successfully receive packets at UEs 110 will be shorter (e.g., 10 ms). On the other hand, the high target BLER may lead to more retransmissions of packets. As a result, the delay to successfully receive packets at UEs 110 will be relatively longer (e.g., 40 ms).

With respect to the WAN interruption probability due to ProSe operation, there are at least two types of UEs 110 served by the same network node 115: a first type of UE (Type 1 UE), whose WAN target quality is below an interruption probability or rate (i.e., $Q<T$); and a second type of UE (Type 2 UE) whose WAN target quality is equal to or above an interruption probability or rate (i.e., $Q \geq T$).

In certain embodiments, network node 115 is capable of scheduling UEs 110 according to different scheduling schemes or algorithms based on the relation between at least the WAN target quality (Q) and the interruption probability or rate (T) when no DRX cycle is used. This may be referred to as a first activity scenario (i.e., where ProSe UE 110 is not configured with DRX at all). This means that ProSe UE 110 is always active, and this requires it to always keep its receiver chain ON. Different scheduling schemes may be available for scheduling UEs in the first activity scenario. As described in more detail below, the different scheduling schemes may include: a first scheduling scheme used for scheduling a first type of UE (i.e., a UE whose WAN target quality is below an interruption probability or rate ($Q<T$); and a second scheduling scheme used for scheduling a second type of UE (i.e., a UE whose WAN target quality is equal to or above an interruption probability or rate ($Q \geq T$).

In case different values of the WAN target quality are set on different serving cells, then network node 115 may use different scheduling schemes for scheduling the same UE 110 on different serving cells. For example, network node 115 may use the first and second schemes on PCell and SCell, respectively.

ProSe UE 110B may be able to operate some ProSe operations while being out of network coverage. For examples, these operations may include one or more of ProSe Direct Communication, ProSe Direct Discovery, etc. These operations may further comprise ProSe transmission, ProSe reception, etc. ProSe UE 110 configured with one or more SCells may have lost all serving cells to be in out of network coverage, (i.e., lost PCell and SCell(s)).

Prior to entering in out of network coverage, ProSe UE 110 may also be configured by the last serving cell (e.g., PCell and/or SCell(s)) with one or more carriers for doing measurements on the cells of the configured carriers. ProSe UE 110 may be configured with such carrier(s) for measuring in idle state and/or in connected state. UE 110 may also be preconfigured with one or more carriers specifically for ProSe operation in out of network coverage. In some embodiments, these ProSe specific carriers may be the same as the serving carriers. The same or different set of carriers may be configured for measurements in idle state and connected state. Examples of such carriers include serving carriers (e.g., intra-frequency aka serving carrier, PCC, SCC(s) PSCC, etc.) and non-serving carriers (e.g., inter-frequency carriers, inter-RAT carriers etc).

In certain embodiments, network node 115 is capable of scheduling UEs 110 according to different scheduling schemes or algorithms when UEs 110 are configured with DRX cycle. This scenario is referred to herein as a second activity scenario. UEs 110 can be configured with one or more DRX cycles. As one example of the second activity scenario, UE 110B may be configured with DRX cycle for ProSe reception only while no DRX is configured for WAN reception. This means UE 110B can be idle (i.e., turn OFF the ProSe receiver chain) most of the time, and it can wake up during DRX-ON duration in order to receive control messages. In this way, ProSe UE 110B can reduce UE power consumption. If DRX is configured only on the ProSe receiver chain, UE 110B can in RRC CONNECTED mode receive WAN continuously (i.e., it keeps the WAN receiver chain always ON). In this case, depending upon the relations between target quality (Q) and interruption probability or rate (T), network node 115 can use a third or a fourth scheduling scheme for scheduling of WAN signals to UE 110B, as described in more detail below.

As a second example of the second activity scenario, UE 110B may not be configured with DRX cycle for ProSe receiver chain while it is configured with DRX cycle on WAN receiver chain. In this case, regardless of the relations between target quality (Q) and interruption probability or rate (T), network node 115 can use a fifth scheduling scheme for scheduling of WAN signals to UE 110B, as described in more detail below.

As a third example of the second activity scenario, UE 110B may be configured with the same DRX cycle for both WAN signal reception and ProSe signal reception. The same DRX cycle means that the UE receiver may be inactive during the DRX ON period and active during the DRX OFF period for both WAN and ProSe operations at the same time. The turning ON/OFF of the two receiver chains takes place at the same time. In this case, regardless of the relations between target quality (Q) and interruption probability or rate (T), network node 115 can use the fifth scheduling scheme for scheduling of WAN signals to UE 110 as described in more detail below.

Thus, certain embodiments may advantageously allow network node 115 to adapt scheduling of WAN according to a set of predefined rules. As described in more detail below, network node 115 may use information on UE target BLER for WAN operation together with WAN interruption rate due to ProSe operation to adapt the network scheduling of WAN.

According to one example embodiment, network node 115 determines whether or not a UE 110, such as UE 110B, is configured with discontinuous reception on a first communication link (e.g., a D2D communication link or sidelink). As described above, a ProSe UE 110 with single receiver chain needs to retune its receiver, which results in interruption of 1 subframe. In addition, all types of ProSe operation require ProSe UE 110 to indicate its interest in initiating or terminating ProSe service. Examples of ProSe service are ProSe Direct Communication and ProSe Direct Discovery. The initiation and termination of the ProSe service is performed during the RRC reconfiguration procedure, and UE 110 is allowed an interruption of up to 1 subframe on WAN during this procedure. The ProSe Direct Communication capable UE may have its own receiver chain that is dedicated for ProSe Direct Communication.

In some cases, network node 115 may also determine whether UE 110B is configured with a common DRX cycle for both WAN and ProSe operations, or whether the UE is configured with individual DRX cycles for ProSe and/or WAN operations. For example, network node 115 may determine whether UE 110B is configured with DRX cycle or not. If UE 110B is in DRX, then network node 115 further determines whether UE 110B is configured with the same or different DRX cycles for WAN and ProSe operations. As described in more detail below, network node 115 may then adapt scheduling for UE 110B based on such determination. For example, network node 115 may adapt scheduling for UEs in non-DRX (which may be interchangeably referred to herein as the first activity scenario). As another example, network node 115 may adapt scheduling for UEs in DRX (which may be interchangeably referred to herein as the second activity scenario).

Network node 115 compares a target quality for a second communication link (e.g., WAN link) with an interruption probability or rate due to operation of the first communication link (e.g., sidelink). As described above, the first and second communication links may be any suitable communication link. For example, in certain embodiments (and in the example shown in FIG. 2), the first communication link may be a sidelink and the second communication link may be a WAN link. The target quality for the second communication link may be any suitable parameter. For example, in certain embodiments the target quality for the second communication link may be a WAN target block error ratio (BLER). Thus, in certain embodiments network node 115 may compare the WAN target BLER quality (Q) with the WAN interruption rate due to ProSe operation (T).

In certain embodiments, network node 115 may have information about a predefined WAN interruption rate due to ProSe operation. Typically, the WAN maximum interruption rate is pre-defined. In certain embodiments, network node 115 may, however, also configure UE 110B with a maximum interruption rate threshold, which UE 110B is not allowed to exceed. Network node 115 may obtain the information about the predefined WAN interruption rate in any suitable manner.

Network node 115 selects a scheduling scheme based at least in part on the comparison of the target quality for the second communication link with the interruption probability or rate due to operation of the first communication link. Thus, network node 115 may use at least the information on WAN interruption rate together with at least the information about the WAN target quality (e.g., target BLER, target FER, etc.) to decide which one or more actions to take in order to ensure that the interruption at the WAN due to the ProSe operation by UE 110 is avoided or at least minimized. The WAN target quality may be configured by network node 115 at UE 110B for achieving the desired performance in the DL.

For example, in certain embodiments network node 115 may determine that UE 110B is not configured with any DRX cycle (i.e., its WAN receiver is active continuously and can receive ProSe signals during ProSe subframes). As described above, this referred to as the first activity scenario. In such a case, the one or more actions related to scheduling may depend on a relationship between the WAN interruption rate (T) and the WAN target quality (Q) (e.g., a difference between their respective values, whether they are equal or different, or any other suitable relationship).

In the first activity scenario in which UE 110B is not configured with any DRX cycle, network node 115 may compare the target quality (Q) for the second communication link with the interruption probability or rate (T) due to operation of the first communication link. Based on this comparison, network node 115 selects a scheduling scheme, and schedules one or more resources for UE 110B according to the selected scheduling scheme. For example, if Q<T, network node 115 may use a first scheduling scheme to schedule UE 110B. According to the first scheduling scheme, network node 115 may schedule UE 110B in subframes which at least partly overlap in time with the ProSe subframes (i.e., during the time when ProSe operation can occur). During this time, ProSe will have its receiver chain ON and will not cause any interruption. In other words, network node 115 may schedule WAN during one or more ProSe resources (e.g., one or more subframes or slots which are configured for ProSe operation). This may ensure that the WAN quality target is achieved since loss of scheduling grant and loss of control channel reception will not occur. This may also ensure that the resources for WAN operation (e.g., PDCCH, PDSCH transmissions) are used in an efficient manner.

If Q≥T, network node 115 may use the second scheduling scheme to schedule UE 110B. In the second scheduling scheme, the WAN may be scheduled in any subframe or slots during a frame. This may also ensure that the WAN quality target is achieved, even with occasional loss of scheduling grant and control channel reception.

In certain embodiments, network node 115 determines that UE 110B is configured with individual DRX only for ProSe operation. This is an example of the second activity scenario described above. In such a case, network node 115 compares the target quality (Q) for the second communication link (e.g., WAN link) with the interruption probability or rate (T) due to operation of the first communication link (e.g., sidelink). If network node 115 determines that UE 110B is configured with individual DRX only for ProSe operation, and if Q<T, network node 115 may schedule WAN UE 110B according to a third scheduling scheme. In certain embodiments, according to the third scheduling scheme, UE 110B is scheduled with WAN signals during WAN subframes that overlap with ON duration of the ProSe DRX cycle. In other words, UE 110B is scheduled with WAN signals in uplink and/or downlink during DRX-ON of the ProSe DRX cycle (i.e., during time when UE 110B will not cause interruption to WAN due to any ProSe operation).

If network node 115 determines that UE 110B is configured with individual DRX only for ProSe operation, and that Q≥T, network node 115 may schedule UE 110B according to a fourth scheduling scheme. According to the fourth scheduling scheme, UE 110B is scheduled with WAN signals during any WAN subframe regardless of whether or not they overlap with ON duration of the ProSe DRX cycle. In other words, network node 115 may schedule WAN signals in any subframe.

If network node 115 determines that UE 110B is configured with at least individual or common DRX cycle for WAN, network node 115 may schedule UE 110B according to a fifth scheduling scheme. In certain embodiments, according to the fifth scheduling scheme UE 110B is scheduled with WAN signals during the ON duration of the WAN DRX cycle regardless of the relation between target BLER and the WAN interruption rate (i.e., irrespective of the values of Q and T). Thus, network node 115 may schedule WAN signals for UE 110B in uplink and/or downlink during DRX-ON of the WAN DRX cycle, regardless of the relation between Q and T. This is because ProSe operation is required to not cause interruption to WAN during the ON duration of WAN DRX cycle. Since the ProSe UE 110B does not cause any interruption to WAN during the ON duration of the WAN DRX cycle, WAN quality will therefore not be degraded for UE 110B even if its Q<T.

From the network perspective, the various embodiments described herein may advantageously adapt the WAN scheduling such that WAN performance is not degraded due to interruption caused by ProSe operations. For example, if independent DRX is configured on the ProSe receiver chain, by taking into account the level of target BLER and maximum interruption rate on WAN, network node 115 can schedule important WAN UEs 110 (e.g., UEs which require high QoS) on subframes which are not subject to interruption. Examples of such subframes are those during ProSe DRX-ON duration during which the ProSe receiver chain will always be ON hence no interruption during that duration on WAN is expected. On the contrary, if ProSe UE 110B is configured with DRX on both ProSe and WAN or if UE 110B is not configured with DRX, network node 115 may schedule WAN UEs in subframes at least partly overlapping with ProSe subframes as the ProSe receiver chain will always be ON during these subframes. This may advantageously avoid ProSe interruption taking place during WAN transmission and thereby reducing the WAN performance.

In certain embodiments, a method for adapting ProSe receiver for minimizing interruption on WAN in ProSe capable UE 110 is disclosed. This embodiment may be implemented in a ProSe capable UE, such as UE 110B. In certain embodiments, the method enables the ProSe capable UE 110B to adapt its receiver behavior based on one or more parameters. The parameters may be any suitable parameters, and may be pre-configured and/or may be signaled by network node 115. For example, the one or more parameters may include target BLER, which may be configured for each UE, and maximum WAN interruption rate, which may be pre-defined or can be configured.

As described above, a ProSe UE 110B with single receiver chain may need to retune its receiver, which results in interruption of up to 1 subframe. In addition, all types of ProSe operations require ProSe UE 110B to indicate its interest in initiating or terminating ProSe service. Examples of ProSe service are ProSe Direct Communication and ProSe Direct Discovery. The initiation and termination of the ProSe service is performed during the RRC reconfiguration procedure, and UE 110B is allowed an interruption of up to 1 subframe on WAN during this procedure. Network node 115 can configure UE 110B with a maximum interruption rate threshold which UE 110B is not allowed to exceed. The ProSe Direct Communication capable UE may have its own receiver chain, which is dedicated for ProSe Direct Communication.

According to one example embodiment, UE 110B may determine a maximum interruption rate due to operation of a first communication link. For example, UE 110B may obtain a pre-defined or configured value of maximum allowed interruption rate (T) on the serving cell due to ProSe operation. UE 110B may determine a target quality for a second communication link. For example, UE 110B may obtain information about a configured target BLER (Q) for WAN service on a serving cell. UE 110B may compare the target quality for the second communication link with the maximum interruption rate.

UE 110B may adapt one or more receiver behaviors based at least in part on the comparison of the target quality for the second communication link with the maximum interruption rate. In some cases, UE 110B may perform one or more actions according to one or more pre-defined rules, or in response to receiving a request from network node 115. For example, UE 110B may decide whether to turn its ProSe receiver chain ON/OFF and/or when to turn ProSe receiver chain ON/OFF in case it decides to turn its receiver chain ON/OFF in order to maintain the target BLER and the maximum allowed interruption rate. In one example, the configured target BLER may be higher than or equal to the maximum interruption rate. In this case, the ProSe UE may choose to turn the receiver chain OFF in order to save power. But in another example, the target BLER may be lower than maximum interruption rate. In this case, ProSe UE 110B may choose to not turn OFF the receiver chain in order not to cause interruption on WAN to meet the maximum allowed interruption rate on WAN.

In certain embodiments, UE 110B may send information about turning the receiver chain ON/OFF and/or actual BLER (Qa) and actual interruption rate (Ta) to network node 115. As one example, ProSe UE 110B may send the results related to the actual interruption rate to network node 115. In some cases, UE 110B may also inform the network node in case the actual interruption rate exceeds the maximum allowed interruption rate. UE 110B may also indicate whether actual BLER remains within the target BLER or not while causing interruption due to ProSe operation. UE 110B may send the above described information or indication to network node 115 periodically, on an event-triggered basis, or in any other suitable manner.

In certain embodiments, ProSe UE 110B may explicitly receive an indication from network node 115 indicating whether it is allowed to turn its ProSe receiver chain ON/OFF. In some cases, this may be a one-time indication taking place during the initiation of the service, and/or ProSe UE 110B can receive updated indications over time during ProSe operation. In this case, the decision whether UE 110B is allowed to turn its receiver chain ON/OFF is made by network node 115, and communicated to UE 110B (for example, via RRC signaling).

Network node 115 may use the received information about the actual interruption rate and/or its relation with the actual BLER for adapting one or more radio operations. For example, network node 115 may adapt scheduling based on the received results. For example, if actual BLER (Qa) is below actual interruption rate (Ta) for a particular UE 110, then network node 115 may use the first scheduling scheme if no DRX is used, or the third scheduling scheme if only ProSe DRX is used for scheduling WAN signals to that UE.

As another example, network node 115 may change the DRX cycle configuration or configure DRX cycle(s) for a particular UE 110. For example, if Qa>Q and no DRX cycle is used on ProSe for that particular UE, then network node 115 may configure DRX cycle for ProSe reception. This may allow network node 115 to use the third scheduling scheme for scheduling WAN signals to that UE.

As another example, network node 115 may change the maximum interruption rate, and may signal the new value to UE 110. For example, if BLER target cannot be met, then network node 115 may reduce the maximum interruption rate (e.g., from 0.5% to 0.4%).

Thus, the ProSe UE 110B and/or network node 115 detect whether UE 110B is configured with DRX, whether it is an independent DRX on ProSe receiver chain or whether it is the same DRX on ProSe and WAN, and compare a target BLER and maximum interruption rate on WAN. Based on this, network node 115 may adapt its scheduling of WAN and/or ProSe UE 110B decides whether to turn ON/OFF its ProSe receiver chain.

By taking into account the configured target BLER at the (serving) cell and pre-defined interruption rate due to ProSe operation when performing scheduling of WAN UEs, the various embodiments described herein may advantageously avoid configurations that degrade WAN performance. In certain embodiments, this is achieved by avoiding scheduling of UEs 110 in subframes that are subject to interruption. Rather, the various embodiments may improve WAN performance for UEs 110 that may require high QoS by scheduling them in subframes that are not subject to interruption. This may ensure that the QoS of such UEs 110 are maintained. As another example, certain embodiments may improve the overall WAN performance and system capacity while not limiting the ProSe performance and capacity.

From the perspective of a ProSe UE 110, the various embodiments described herein may advantageously allow UEs to use information on configured target BLER and maximum interruption rate to determine whether to turn their ProSe receiver chain ON/OFF. In addition, the various embodiments may allow UEs to receive an explicit command from network node 115 regarding whether UE 110B is allowed to turn its ProSe receiver chain ON/OFF, to receive an explicit command from network node 115 regarding what action to take, and/or to send an indication to network node 115 (for example, regarding results related to the actual interruption rate.

Figure 3:
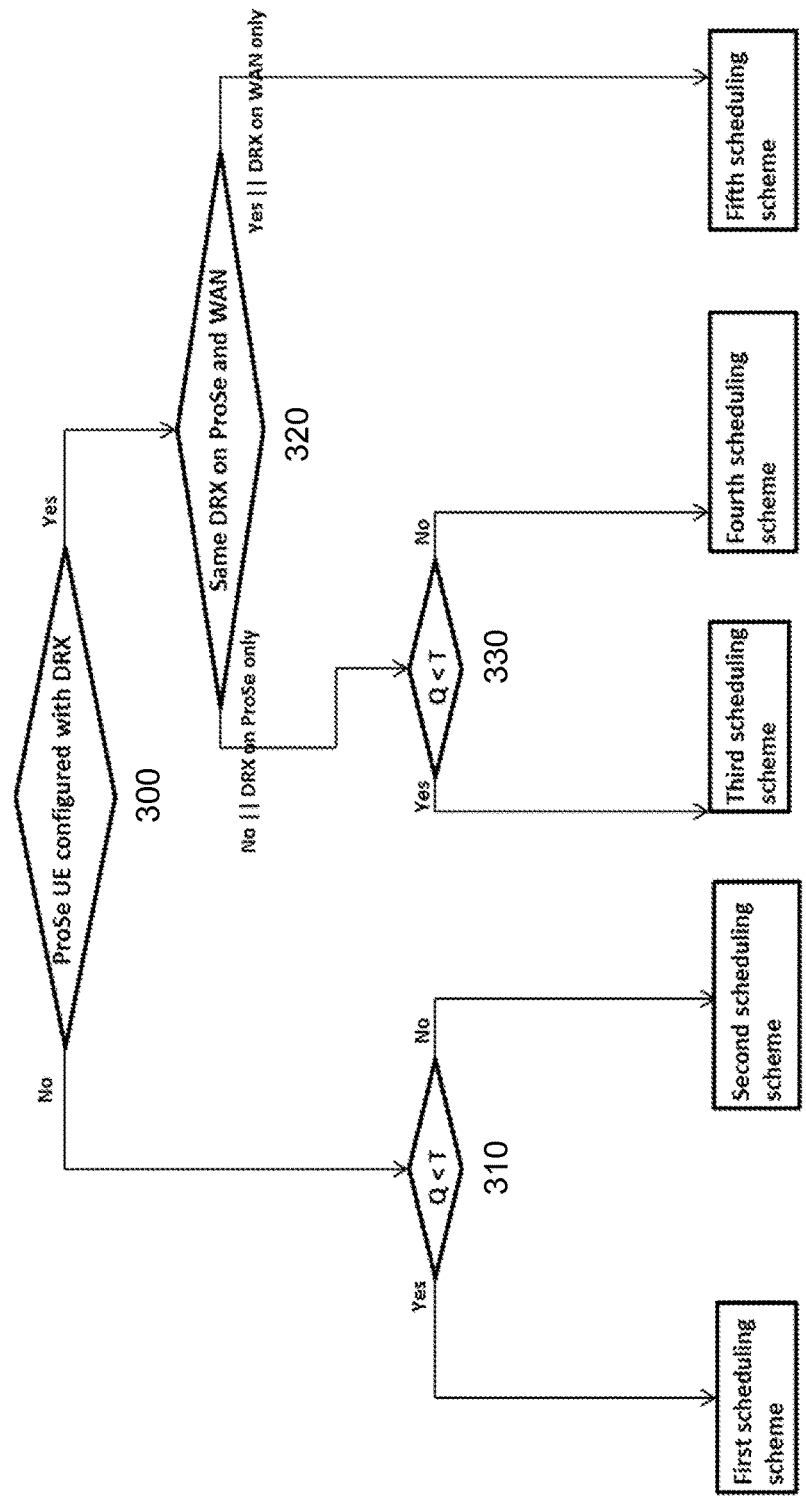
FIG. 3 is a flow chart of a method in a network node, in accordance with certain embodiments.

FIG. 3 is a flow chart of a method in a network node, in accordance with certain embodiments. The method begins at step 300. At step 300, the network node determines whether the ProSe UE is configured with DRX. If the ProSe UE is not configured with DRX, the method proceeds to step 310. It is assumed that the ProSe receiver chain is always turned ON after the initiation of the service (e.g., when the UE is configured with ProSe resources for ProSe operation).

At step 310, the network node compares a target quality for a second communication link (e.g., WAN communication link) with an interruption probability or rate due to operation of a first communication link (e.g., sidelink). For example, in certain embodiments the network node determines whether the configured target quality (Q) (e.g., BLER) for the ProSe UE for WAN operation is less than the (pre-)configured maximum interruption rate (T). If the network node determines that the WAN target BLER is less than the maximum interruption rate, then the network node may use a first scheduling scheme. The first scheduling scheme may ensure that ProSe does not cause interruption on WAN. In certain embodiments, this may be achieved by scheduling the WAN during DL subframes (i.e., WAN subframes) which at least partly or fully overlap in time with ProSe subframes in the sidelink. ProSe subframes are typically configured in burst (e.g., 4-5 subframes every 40 ms). During ProSe subframes, the UE keeps the ProSe receiver chain active as well as the WAN receiver chain (i.e., the UE does not cause any interruption during the ProSe subframes). In other words, the ProSe UE may retune (i.e., turn it ON or OFF) its ProSe receiver chain before or after the ProSe subframes to ensure it can receive during the ProSe subframes.

However, if it is determined that the WAN target BLER is greater than or equal to the maximum interruption rate, then the network node may use the second scheduling scheme for scheduling WAN in any subframes. According to the second scheduling scheme, one or more WAN subframes may be interrupted due to actions performed by the UE on ProSe receiver chain. As an example, during one or more subframes, which do not overlap with ProSe subframes, the UE may turn its ProSe receiver ON or OFF. This action of retuning of ProSe receiver may cause interruption on WAN subframes in both UL and DL. Since the WAN quality target is less stringent compared to the interruption rate, the second scheduling scheme in this case will not degrade the desired QoS (i.e., WAN target quality can still be met). Typically, under a high traffic load of the first type of UEs, the network node may schedule the second type of UEs for WAN in subframes that do not overlap with ProSe subframes. Under low traffic load of the first type of UEs, however, the network node may schedule the second type of UEs for WAN in any subframes (i.e., the network node will have more freedom in terms of scheduling the second type of UE for WAN signals, such as, for example, on data channels like PDSCH, PUSCH).

Thus, the network node may prioritize scheduling of WAN signals to high QoS UEs in subframes overlapping at least partly with ProSe subframes, and schedule UEs with less stringent QoS in any WAN subframe.

In case the network node determines at step 300 that the ProSe UE is configured with DRX cycle, the method proceeds to step 320 to determine whether the ProSe UE is configured with the same DRX cycle on ProSe and WAN or whether the ProSe UE is configured with individual DRX cycles for WAN reception and ProSe reception. The network node may further determine if the DRX cycle is used only on WAN and not for ProSe.

The individual DRX cycles (also referred to as separate or different DRX cycles) mean that the configured DRX cycles can be operated independently by the UE for ProSe reception on sidelink and WAN reception on downlink subframes. The individual DRX cycles may also be referred to as ProSe DRX cycle and WAN DRX cycle.

Depending upon the determination of the DRX cycle configuration at step 320, the network node may adapt the scheduling as described in detail below.

The network node may determine that the ProSe UE is not configured with the same DRX on ProSe and WAN. If the network node determines at step 320 that the ProSe UE is configured with DRX cycle only for ProSe reception and not for WAN reception (i.e., only with ProSe DRX cycle), then the network node selects one of the third scheduling scheme or the fourth scheduling scheme for scheduling the ProSe UE with WAN signals based on a comparison at step 330 of the configured target BLER (Q) with the maximum WAN interruption rate (T) due to ProSe operation. The network node may select the third scheduling scheme for a UE whose Q<T. In certain embodiments, according to the third scheduling scheme, the UE is scheduled with WAN signals during WAN subframes that overlap with ON duration of the ProSe DRX cycle. The network node may select the fourth scheduling scheme for a UE whose Q≥T. In certain embodiments, according to the fourth scheduling scheme, the UE is scheduled with WAN signals during any WAN subframe regardless of whether or not they overlap with ON duration of the ProSe DRX cycle.

If it is determined at step 320 that the ProSe UE is configured with the same DRX cycle on both ProSe and WAN, or if the DRX cycle is configured only for WAN signal reception, then the network node may select the fifth scheduling scheme for scheduling WAN signals. In certain embodiments, according to the fifth scheduling scheme the UE is scheduled with WAN signals during the ON duration of the WAN DRX cycle regardless of the relation between target BLER and the WAN interruption rate (i.e., irrespective of the values of Q and T). Since the ProSe UE does not cause any interruption to WAN during the ON duration of the WAN DRX cycle, WAN quality will therefore not be degraded for a UE even if its Q<T.

Figure 4:
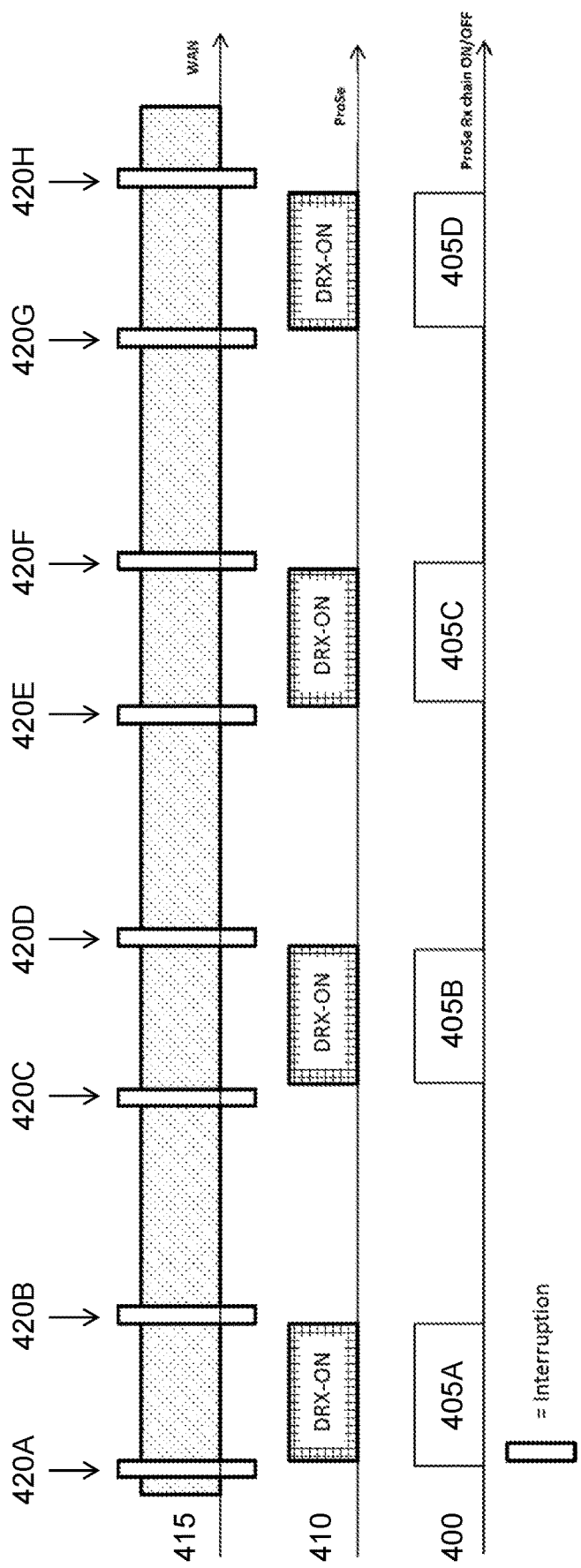
FIG. 4 illustrates an example of a ProSe UE that is configured with DRX cycle for ProSe reception chain while no DRX is configured for WAN reception, in accordance with certain embodiments.

FIG. 4 illustrates an example of a ProSe UE that is configured with DRX cycle for ProSe reception chain while no DRX is configured for WAN reception. More particularly, FIG. 4 illustrates the ProSe receiver chain ON/OFF 400, the ProSE DRX operation 410, and the WAN link 415. ProSe receiver chain ON/OFF 400 on the lower part of FIG. 4 shows the ProSe receiver behavior that is turned ON (at intervals 405A-D) and OFF during the time the UE wakes up during DRX-ON duration and sleeps otherwise. As can be seen from FIG. 4, ON intervals 405A-D coincide with DRX-ON periods shown in ProSe DRX operation 410. Each time the ProSe receiver chain is turned ON or OFF (i.e., at the beginning and end of each of intervals 405A-D), this causes an interruption on WAN 415. These interruptions are shown in FIG. 4 as interruptions 420A-H.

FIG. 4 illustrates the interruption for the case where the UE is not configured with additional cells or carriers. But the same interruption behavior applies for that case also. By making sure that the high QoS UEs are scheduled during the DRX-ON, the network node can make sure that their transmissions are not interrupted due to ProSe. The main difference with this kind of WAN scheduling (third scheduling scheme) compared to the case where a UE is scheduled anytime with no coordination with ProSe receiver chain is that the ProSe UE behavior (receiver behavior) may change over time, which is not taken into account by the scheduling. For example, the ProSe UE with a dedicated ProSe receiver chain may turn the receiver chain OFF during inactive period in order to reduce the UE power consumption. This type of behavior may be difficult to predict from WAN perspective. By adapting the WAN scheduling such that the important data/UEs, (e.g., UEs with low BLER and high QoS demands (i.e., whose Q<T)), are scheduled during the ProSe DRX-ON duration, network node can ensure that their performance is not degraded due to ProSe operation.

Figure 5:
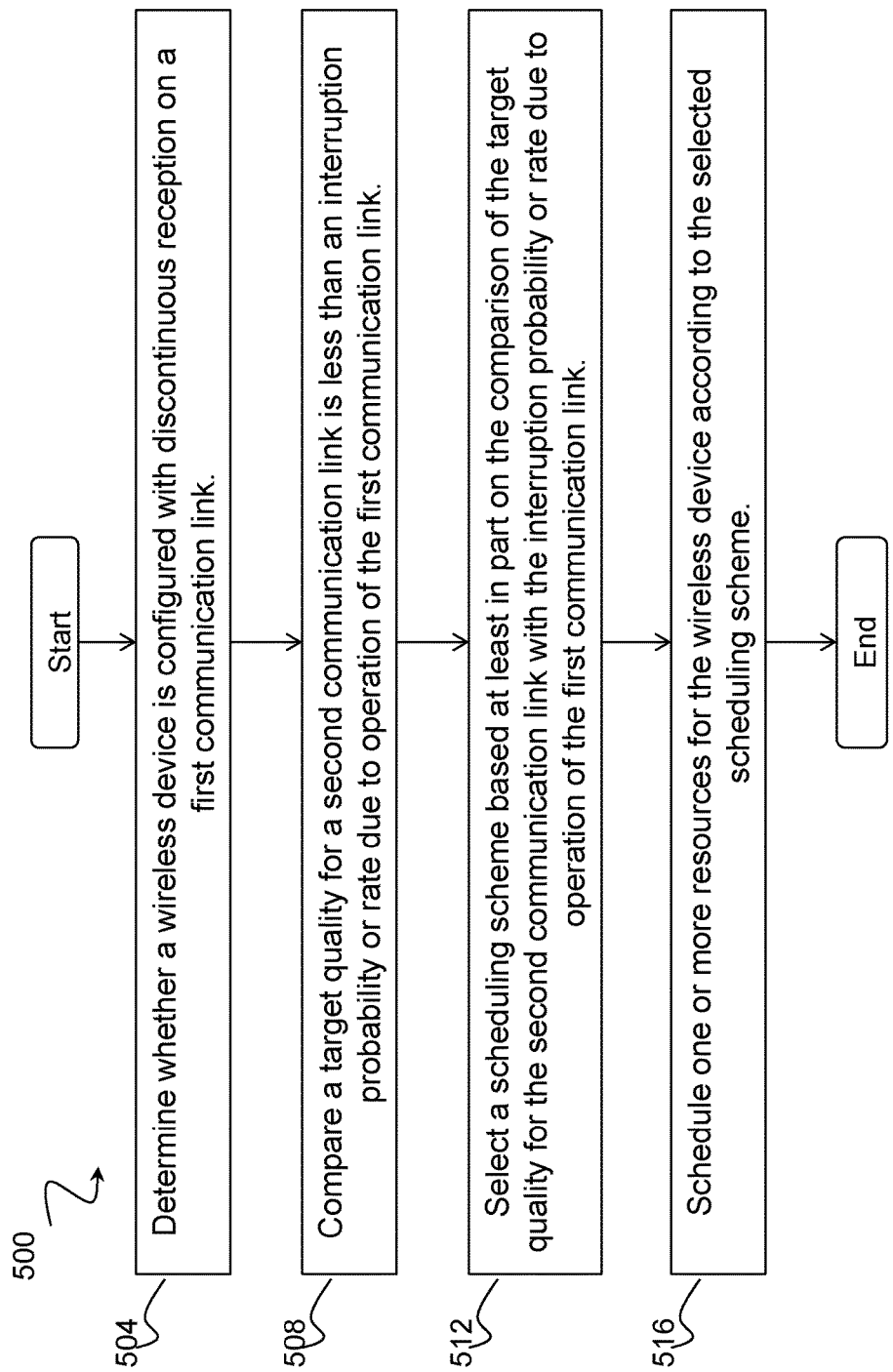
FIG. 5 is a flow chart of a method in a network node, in accordance with certain embodiments.

FIG. 5 is a flow chart of a method in a network node, in accordance with certain embodiments. The method begins at step 504, where the network node determines whether a wireless device is configured with discontinuous reception on a first communication link. At step 508, the network node compares a target quality for a second communication link with an interruption probability or rate due to operation of the first communication link. In certain embodiments, the target quality for the second communication link may comprise one of a target block error ratio and a target frame error rate. The first communication link may comprise sidelink communication and the second communication link may comprise wide area network communication.

At step 512, the network node selects a scheduling scheme based at least in part on the comparison of the target quality for the second communication link with the interruption probability or rate due to operation of the first communication link.

At step 516, the network node schedules one or more resources for the wireless device according to the selected scheduling scheme. In certain embodiments, selecting the scheduling scheme may comprise selecting a first scheduling scheme upon determining that the wireless device is not configured with discontinuous reception on the first communication link and that the target quality for the second communication link is less than the interruption probability or rate due to operation of the first communication link. In an example embodiment, scheduling one or more resources for the wireless device according to the selected first scheduling scheme may comprise scheduling one or more resources for the second communication link that at least partly overlap in time with one or more resources configured for the first communication link.

In certain embodiments, selecting the scheduling scheme may comprise selecting a second scheduling scheme upon determining that the wireless device is not configured with discontinuous reception on the first communication link and that the target quality for the second communication link is not less than the interruption probability or rate due to operation of the first communication link. In an example embodiment, scheduling one or more resources for the wireless device according to the selected second scheduling scheme may comprise scheduling one or more resources for the second communication link in any subframe or slot.

In certain embodiments, the network node may, upon determining that the wireless device is configured with discontinuous reception on the first communication link, determine whether a discontinuous reception cycle for the first communication link is the same as a discontinuous reception cycle for the second communication link. In an example embodiment, selecting the scheduling scheme may comprise selecting a third scheduling scheme upon determining that the discontinuous reception cycle for the first communication link is not the same as the discontinuous reception cycle for the second communication link and that the target quality for the second communication link is less than the interruption probability or rate due to operation of the first communication link. In one example embodiment, scheduling one or more resources for the wireless device according to the selected third scheduling scheme may comprise scheduling one or more resources for the second communication link that at least partly overlap with an ON duration of the discontinuous reception cycle for the first communication link.

In certain embodiments, selecting the scheduling scheme may comprise selecting a fourth scheduling scheme upon determining that the discontinuous reception cycle of the first communication link is not the same as the discontinuous reception cycle for the second communication link and that the target quality for the second communication link is not less than the interruption probability or rate due to operation of the first communication link. In one example embodiment, scheduling one or more resources for the wireless device according to the selected fourth scheduling scheme may comprise scheduling one or more resources for the second communication link regardless of whether the one or more resources overlap with an ON duration of the discontinuous reception cycle for the first communication link.

In certain embodiments, selecting the scheduling scheme may comprise selecting a fifth scheduling scheme upon determining that the discontinuous reception cycle for the first communication link is the same as the discontinuous reception cycle for the second communication link. In one example embodiment, scheduling one or more resources for the wireless device according to the selected fifth scheduling scheme may comprise scheduling one or more resources for the second communication link that at least partly overlap with an ON duration of the discontinuous reception cycle for the second communication link.

In certain embodiments, the method may further comprise receiving, from the wireless device, information about at least one of an actual quality for the second communication link and an actual interruption rate for the first communication link. In some cases, the network node may change a discontinuous reception cycle configuration for the wireless device based on the received information.

Figure 6:
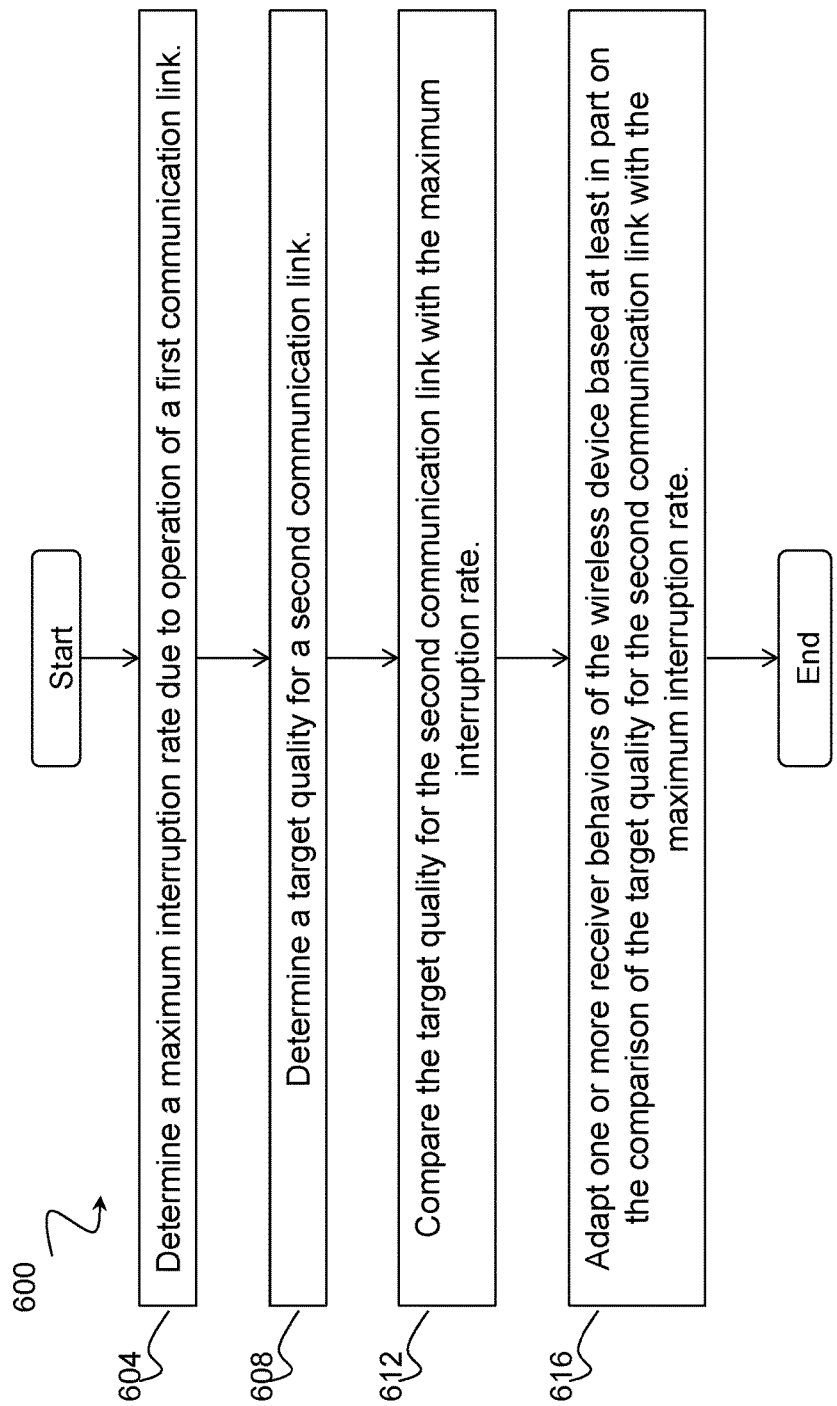
FIG. 6 is a flow chart of a method in a wireless device, in accordance with certain embodiments.

FIG. 6 is a flow chart of a method in a wireless device, in accordance with certain embodiments. The method begins at step 604, where the wireless device determines a maximum interruption rate due to operation of a first communication link. At step 608, the wireless device determines a target quality for a second communication link.

At step 612, the wireless device compares the target quality for the second communication link with the maximum interruption rate. In certain embodiments, the target quality for the second communication link may be one of a target block error ratio and a target frame error rate. In certain embodiments, the first communication link may comprise sidelink communication and the second communication link may comprise wide area network communication.

At step 616, the wireless device adapts one or more receiver behaviors of the wireless device based at least in part on the comparison of the target quality for the second communication link with the maximum interruption rate. In certain embodiments, adapting one or more receiver behaviors of the wireless device may comprise, upon determining that the target quality for the second communication link is not lower than the maximum interruption rate, turning off a receiver chain for the first communication link. In certain embodiments, adapting one or more receiver behaviors of the wireless device may comprise, upon determining that the target quality for the second communication link is lower than the maximum interruption rate, not turning off a receiver chain for the first communication link.

In certain embodiments, the method may further comprise receiving, from a network node, information indicating whether the wireless device is allowed to turn off a receiver chain for the first communication link. In certain embodiments, the method may further comprise sending, to a network node, information indicating a result of the comparison of the target quality for the second communication link with the maximum interruption rate. In certain embodiment, the method may further comprise sending, to a network node, information about at least one of an actual quality for the second communication link and an actual interruption rate for the first communication link.

Figure 7:
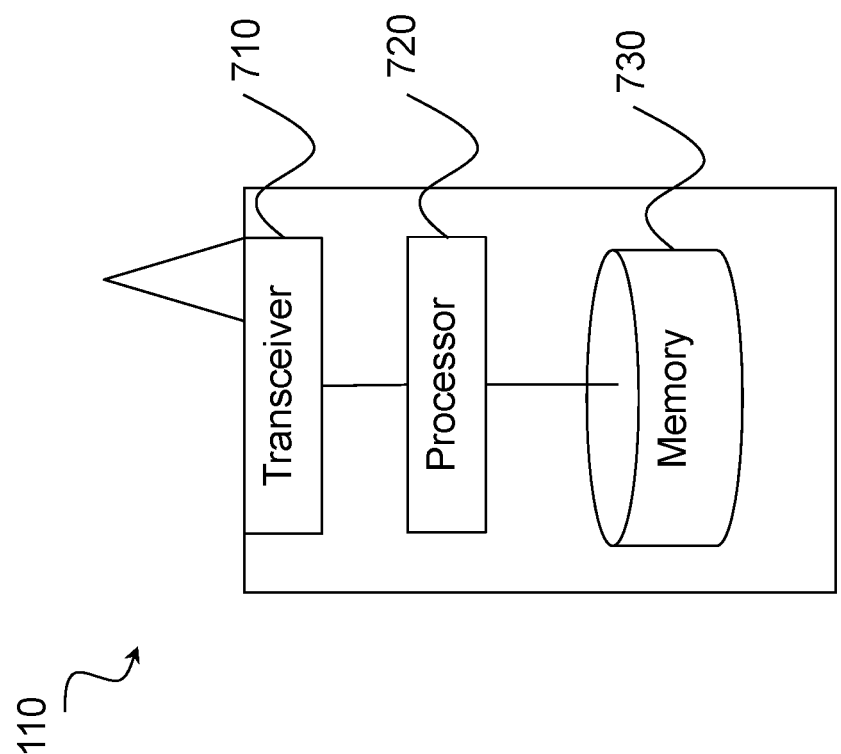
FIG. 7 is a block schematic of an exemplary wireless device, in accordance with certain embodiments.

FIG. 7 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 710, processor 720, and memory 730. In some embodiments, transceiver 710 facilitates transmitting wireless signals to and receiving wireless signals from network node 115 (e.g., via an antenna), processor 720 executes instructions to provide some or all of the functionality described above as being provided by wireless device 110, and memory 730 stores the instructions executed by processor 720.

Processor 720 may include any suitable combination of hardware and software implemented in one or more modules to execute instructions and manipulate data to perform some or all of the described functions of wireless device 110, such as the functions of wireless device 110 described above in relation to FIGS. 1-6. In some embodiments, processor 720 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 720.

Other embodiments of wireless device 110 may include additional components beyond those shown in FIG. 7 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 720. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
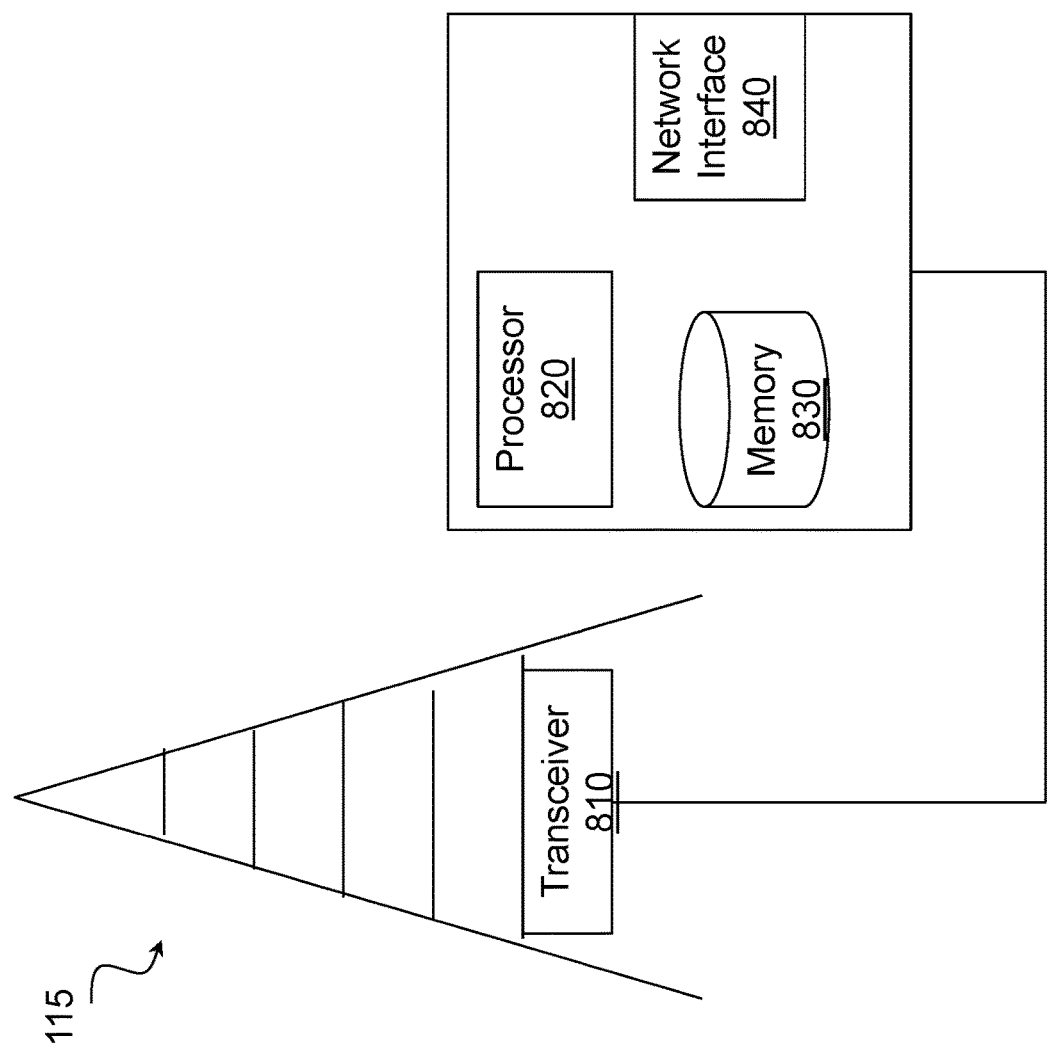
FIG. 8 is a block schematic of an exemplary network node, in accordance with certain embodiments.

FIG. 8 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 810, processor 820, memory 830, and network interface 840. In some embodiments, transceiver 810 facilitates transmitting wireless signals to and receiving wireless signals from wireless device 110 (e.g., via an antenna), processor 820 executes instructions to provide some or all of the functionality described above as being provided by a network node 115, memory 830 stores the instructions executed by processor 820, and network interface 840 communicates signals to backend network components, such as a gateway, switch, router, Internet, Public Switched Telephone Network (PSTN), core network nodes or radio network controllers 130, etc.

Processor 820 may include any suitable combination of hardware and software implemented in one or more modules to execute instructions and manipulate data to perform some or all of the described functions of network node 115, such as those described above in relation to FIGS. 1-6 above. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for network node 115, send output from network node 115, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of network node 115 may include additional components beyond those shown in FIG. 8 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 9:
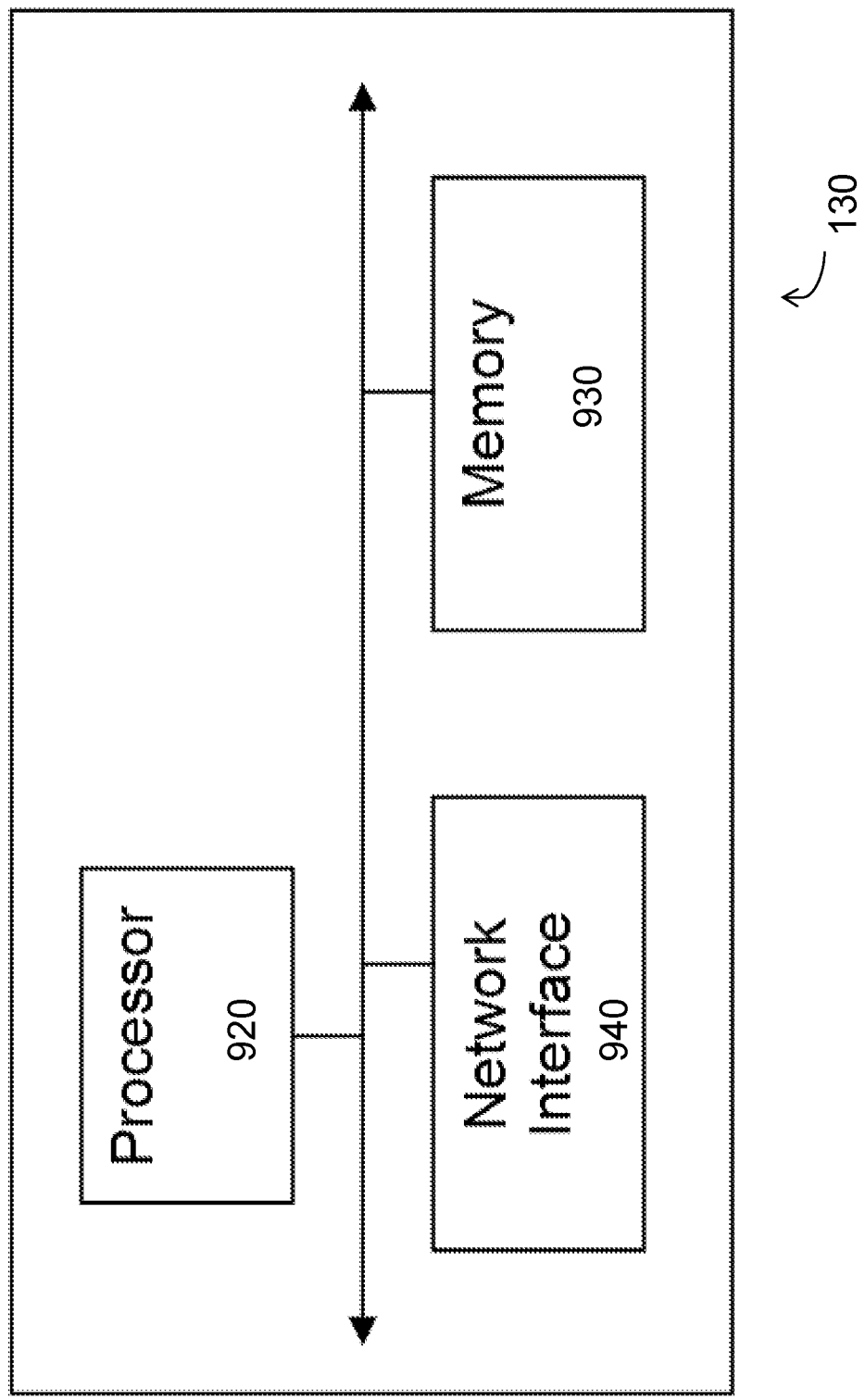
FIG. 9 is a block schematic of an exemplary radio network controller or core network node, in accordance with certain embodiments.

FIG. 9 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 920, memory 930, and network interface 940. In some embodiments, processor 920 executes instructions to provide some or all of the functionality described above as being provided by the network node, memory 930 stores the instructions executed by processor 920, and network interface 940 communicates signals to any suitable node, such as a gateway, switch, router, Internet, Public Switched Telephone Network (PSTN), network nodes 115, radio network controllers or core network nodes 130, etc.

Processor 920 may include any suitable combination of hardware and software implemented in one or more modules to execute instructions and manipulate data to perform some or all of the described functions of the radio network controller or core network node 130. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Figure 10:
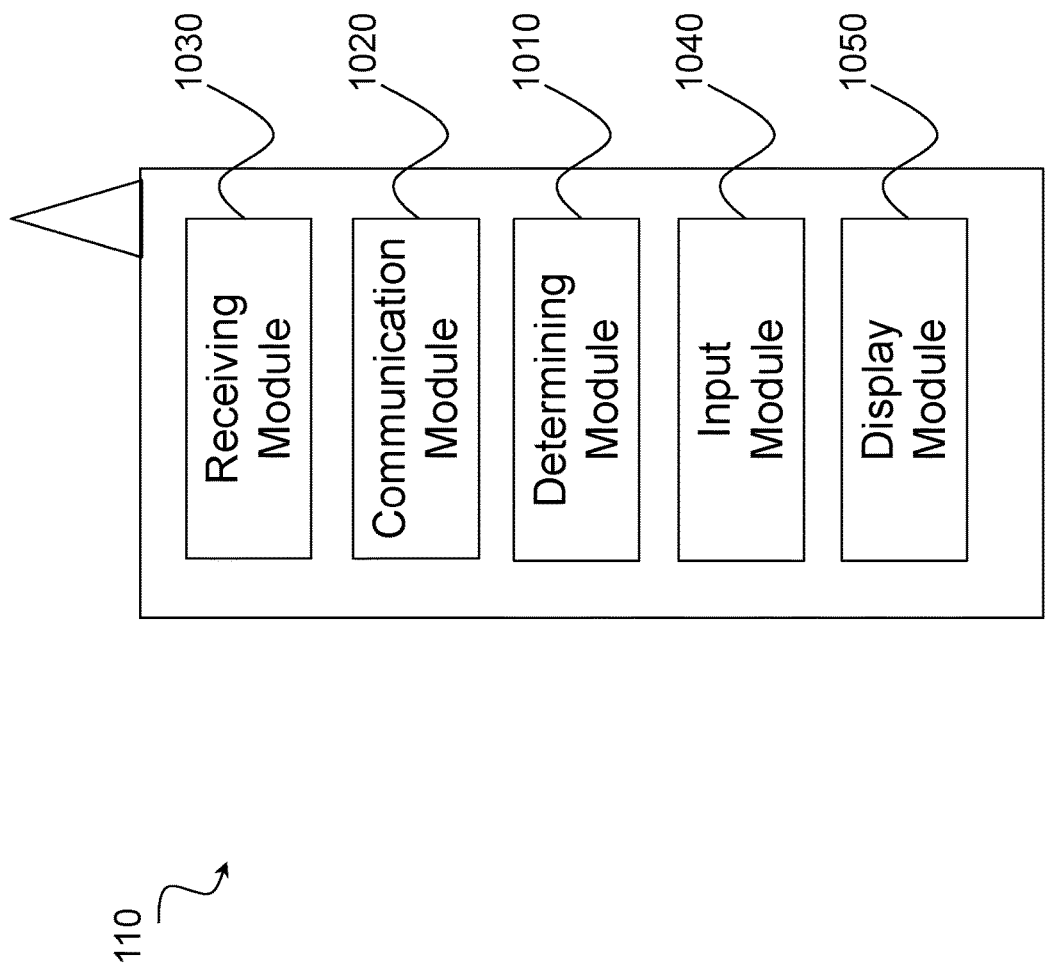
FIG. 10 is a block schematic of an exemplary wireless device, in accordance with certain embodiments.

FIG. 10 is a block schematic of an exemplary wireless device, in accordance with certain embodiments. Wireless device 110 may include one or more modules. For example, wireless device 110 may include a determining module 1010, a communication module 1020, a receiver module 1030, an input module 1040, a display module 1050, and any other suitable modules. Wireless device 110 may perform the methods for reducing serving cell interruption due to ProSe operation described above with respect to FIGS. 1-6.

Determining module 1010 may perform the processing functions of wireless device 110. For example, determining module 1010 may determine a maximum interruption rate due to operation of a first communication link. As another example, determining module 1010 may determine a target quality for a second communication link. As still another example, determining module 1010 may compare the target quality for the second communication link with the maximum interruption rate. As yet another example, determining module 1010 may adapt one or more receiver behaviors of the wireless device based at least in part on the comparison of the target quality for the second communication link with the maximum interruption rate. Determining module 1010 may include or be included in one or more processors, such as processor 720 described above in relation to FIG. 7. Determining module 1010 may include analog and/or digital circuitry configured to perform any of the functions of determining module 1010 and/or processor 720 described above. The functions of determining module 1010 described above may, in certain embodiments, be performed in one or more distinct modules.

Communication module 1020 may perform the transmission functions of wireless device 110. For example, communication module 1020 may send, to a network node, information indicating a result of the comparison of the target quality for the second communication link with the maximum interruption rate. As another example, communication module 1020 may send, to a network node, information about at least one of an actual quality for the second communication link and an actual interruption rate for the first communication link. Communication module 1020 may transmit messages to one or more of network nodes 115 of network 100. Communication module 1020 may include a transmitter and/or a transceiver, such as transceiver 710 described above in relation to FIG. 7. Communication module 1020 may include circuitry configured to wirelessly transmit messages and/or signals. In particular embodiments, communication module 1020 may receive messages and/or signals for transmission from determining module 1010.

Receiving module 1030 may perform the receiving functions of wireless device 110. As one example, receiving module 1030 may receive, from a network node, information indicating whether the wireless device is allowed to turn off a receiver chain for the first communication link. Receiving module 1030 may include a receiver and/or a transceiver. Receiving module 1030 may include circuitry configured to wirelessly receive messages and/or signals. In particular embodiments, receiving module 1030 may communicate received messages and/or signals to determining module 1010.

Input module 1040 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1010.

Display module 1050 may present signals on a display of wireless device 110. Display module 1050 may include the display and/or any appropriate circuitry and hardware configured to present signals on the display. Display module 1050 may receive signals to present on the display from determining module 1010.

Determining module 1010, communication module 1020, receiving module 1030, input module 1040, and display module 1050 may include any suitable configuration of hardware and/or software. Wireless device 110 may include additional modules beyond those shown in FIG. 10 that may be responsible for providing any suitable functionality, including any of the functionality described above and/or any additional functionality (including any functionality necessary to support the various solutions described herein).

Figure 11:
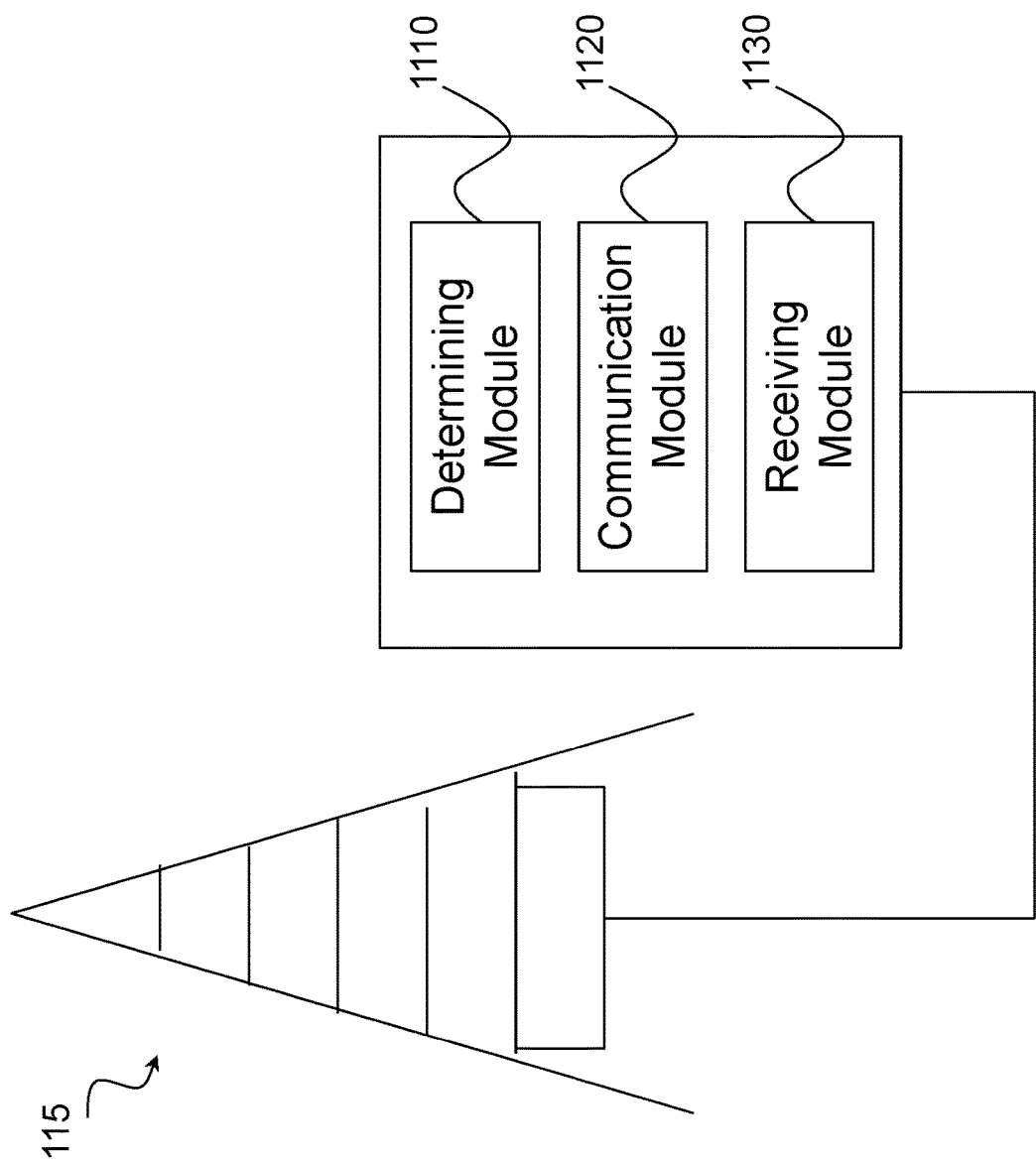
FIG. 11 is a block schematic of an exemplary network node, in accordance with certain embodiments.

FIG. 11 is a block schematic of an exemplary network node 115, in accordance with certain embodiments. Network node 115 may include one or more modules. For example, network node 115 may include determining module 1110, communication module 1120, receiving module 1130, and any other suitable modules. In some embodiments, one or more of determining module 1110, communication module 1120, receiving module 1130, or any other suitable module may be implemented using one or more processors, such as processor 820 described above in relation to FIG. 8. In certain embodiments, the functions of two or more of the various modules may be combined into a single module. Network node 115 may perform the methods for reducing serving cell interruption due to ProSe operation described above with respect to FIGS. 1-6.

Determining module 1110 may perform the processing functions of network node 115. As one example, determining module 1110 may determine whether a wireless device is configured with discontinuous reception on a first communication link. As another example, determining module 1110 may compare a target quality for a second communication link with an interruption probability or rate due to operation of the first communication link. As still another example, determining module 1110 may select a scheduling scheme based at least in part on the comparison of the target quality for the second communication link with the interruption probability or rate due to operation of the first communication link. As yet another example, determining module 1110 may schedule one or more resources for the wireless device according to the selected scheduling scheme. As a further example, determining module 1110 may determine whether a discontinuous reception cycle for the first communication link is the same as a discontinuous reception cycle for the second communication link. As another example, determining module 1110 may change a discontinuous reception cycle configuration for the wireless device based on the received information. Determining module 1110 may include or be included in one or more processors, such as processor 820 described above in relation to FIG. 8. Determining module 1110 may include analog and/or digital circuitry configured to perform any of the functions of determining module 1110 and/or processor 820 described above. The functions of determining module 1110 may, in certain embodiments, be performed in one or more distinct modules.

Communication module 1120 may perform the transmission functions of network node 115. As one example, communication module 1120 may send, to a wireless device, information indicating whether the wireless device is allowed to turn off a receiver chain for the first communication link. Communication module 1120 may transmit messages to one or more of wireless devices 110. Communication module 1120 may include a transmitter and/or a transceiver, such as transceiver 810 described above in relation to FIG. 8. Communication module 1120 may include circuitry configured to wirelessly transmit messages and/or signals. In particular embodiments, communication module 1120 may receive messages and/or signals for transmission from determining module 1110 or any other module.

Receiving module 1130 may perform the receiving functions of network node 115. For example, receiving module 1130 may receive, from the wireless device, information about at least one of an actual quality for the second communication link and an actual interruption rate for the first communication link. Receiving module 1130 may receive any suitable information from a wireless device. Receiving module 1130 may include a receiver and/or a transceiver. Receiving module 1130 may include circuitry configured to wirelessly receive messages and/or signals. In particular embodiments, receiving module 1130 may communicate received messages and/or signals to determining module 1110 or any other suitable module.

Determining module 1110, communication module 1120, and receiving module 1130 may include any suitable configuration of hardware and/or software. Network node 115 may include additional modules beyond those shown in FIG. 11 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
ACK Acknowledged
ADC Analog-to-digital conversion
AGC Automatic gain control
ANR Automatic neighbor relations
AP Access point
BCH Broadcast channel
BLER Block error rate
BS Base station
BSC Base station controller
BTS Base transceiver station
CA Carrier aggregation
CC Component carrier
CG Cell group
CGI Cell global identity
CP Cyclic prefix
CPICH Common pilot channel
CSG Closed subscriber group
DAS Distributed antenna system
DC Dual connectivity
DFT Discrete Fourier Transform
DL Downlink
DL-SCH Downlink shared channel
DRX Discontinuous reception
EARFCN Evolved absolute radio frequency channel number ECGI Evolved CGI
eNB eNodeB
FDD Frequency division duplex
FFT Fast Fourier transform
HD-FDD Half duplex FDD
HO Handover
INC In-Network Coverage
M2M machine to machine
MAC Media access control
MCG Master cell group
MDT Minimization of drive tests
MeNB Master eNode B
MME Mobility management entity
MRTD Maximum receive timing difference
MSR Multi-standard radio
NACK Not acknowledged
OFDM Orthogonal frequency division multiplexing
ONC Out-of-Network Coverage
SI System Information
PCC Primary component carrier
PCI Physical cell identity
PCell Primary Cell
PCG Primary Cell Group
PCH Paging channel
PDU Protocol data unit
PGW Packet gateway
PHICH Physical HARQ indication channel
PLMN Public land mobile network
PNC Partial Network Coverage
ProSe Proximity Services
PSCell Primary SCell
PSC Primary serving cell
PSS Primary synchronization signal
RAT Radio Access Technology
RF Radio frequency
RLM Radio link monitoring
RNC Radio Network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
SCC Secondary component carrier
SCell Secondary Cell
SCG Secondary Cell Group
SeNB Secondary eNode B
SFN System frame number
SGW Signaling gateway
SINR Signal to interference and noise ratio
SON Self-organizing networks
SSC Secondary serving cell
SSS Secondary synchronization signal
TA Timing advance
TAG Timing advance group
TDD Time division duplex
Tx Transmitter
UARFCN UMTS Absolute Radio Frequency Channel Number
UE User equipment
UL Uplink
WAN Wide Area Network

The invention claimed is:

1. A method in a wireless device, comprising:
determining a maximum interruption rate due to operation of a first communication link for ProSe communication;
determining a target quality for a second communication link for wide area network (WAN) communication;
comparing the target quality for the second communication link for WAN communication with the maximum interruption rate for the first communication link for ProSe communication to determine whether the target quality for the second communication link for WAN communication is lower than the maximum interruption rate due to operation of the first communication link for ProSe communication;
determining whether or not to turn off a receiver chain for the first communication link for ProSe communication based at least in part on whether the target quality for the second communication link for WAN communication is lower than the maximum interruption rate due to operation of the first communication link for ProSe communication, and
wherein upon determining that the target quality for the second communication link is lower than the maximum interruption rate, not turning off the receiver chain for the first communication link for ProSe communication.

2. The method of claim 1, wherein upon determining that the target quality for the second communication link is not lower than the maximum interruption rate, turning off the receiver chain for the first communication link for ProSe communication.

3. The method of claim 1, further comprising receiving, from a network node, information indicating whether the wireless device is allowed to turn off a receiver chain for the first communication link.

4. The method of claim 1, further comprising sending, to a network node, information indicating a result of the comparison of the target quality for the second communication link with the maximum interruption rate.

5. The method of claim 1, further comprising sending, to a network node, information about at least one of an actual quality for the second communication link and an actual interruption rate for the first communication link.

6. The method of claim 1, wherein the target quality for the second communication link comprises one of a target block error ratio and a target frame error rate.

7. A wireless device, comprising:
one or more processors, the one or more processors configured to:
determine a maximum interruption rate due to operation of a first communication link for ProSe communication;
determine a target quality for a second communication link for wide area network (WAN) communication;
compare the target quality for the second communication link for WAN communication with the maximum interruption rate for the first communication link for ProSe communication to determine whether the target quality for the second communication link for WAN communication is lower than the maximum interruption rate due to operation of the first communication link for ProSe communication; and
determine whether or not to turn off a receiver chain for the first communication link for ProSe communication based at least in part on whether the target quality for the second communication link for WAN communication is lower than the maximum interruption rate due to operation of the first communication link for ProSe communication, and wherein upon determining that the target quality for the second communication link is lower than the maximum interruption rate, not turning off the receiver chain for the first communication link for ProSe communication.

8. The wireless device of claim 7, wherein upon determining that the target quality for the second communication link is not lower than the maximum interruption rate, the one or more processors are configured to turn off a receiver chain for the first communication link for the ProSe communication.

9. The wireless device of claim 7, wherein the one or more processors are further configured to receive, from a network node, information indicating whether the wireless device is allowed to turn off a receiver chain for the first communication link.

* * * * *